(12) United States Patent
Isogai et al.

(10) Patent No.: US 9,481,369 B2
(45) Date of Patent: Nov. 1, 2016

(54) CRUISE CONTROL SYSTEM FOR DETERMINING OBJECT AS TARGET FOR CRUISE CONTROL

(75) Inventors: Akira Isogai, Anjo (JP); Masao Oooka, Gamagoori (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 1964 days.

(21) Appl. No.: 11/986,702

(22) Filed: Nov. 26, 2007

(65) Prior Publication Data

US 2008/0243351 A1  Oct. 2, 2008

(30) Foreign Application Priority Data

Nov. 27, 2006 (JP) .................... 2006-318813

(51) Int. Cl.
| | | |
|---|---|---|
| B60T 7/12 | (2006.01) | |
| G05D 1/00 | (2006.01) | |
| G06F 7/00 | (2006.01) | |
| G06F 17/00 | (2006.01) | |
| B60T 8/32 | (2006.01) | |
| B60W 30/16 | (2012.01) | |

(52) U.S. Cl.
CPC ........ B60W 30/16 (2013.01); *B60W 2550/143* (2013.01)

(58) Field of Classification Search
USPC .................................................. 701/96, 93
See application file for complete search history.

(56) References Cited

U.S. PATENT DOCUMENTS

| | | | | |
|---|---|---|---|---|
| 5,710,565 A | * | 1/1998 | Shirai | B60K 31/0008 340/903 |
| 2003/0135318 A1 | * | 7/2003 | Tellis | B60K 31/0008 701/96 |
| 2007/0150196 A1 | * | 6/2007 | Grimm | B60T 7/22 701/301 |

FOREIGN PATENT DOCUMENTS

| | | |
|---|---|---|
| JP | 64-052531 | 2/1989 |
| JP | 10-205366 | 8/1998 |
| JP | 11-28948 | 2/1999 |
| JP | 11-045398 | 2/1999 |
| JP | 2000-057498 | 2/2000 |

OTHER PUBLICATIONS

Office action dated Mar. 29, 2011 in corresponding Japanese Application No. 2006-318813.

* cited by examiner

*Primary Examiner* — Imran Mustafa
(74) *Attorney, Agent, or Firm* — Harness, Dickey & Pierce, P.L.C.

(57) ABSTRACT

In a cruise control system installed in a vehicle, a monitoring unit monitors a region predetermined in front of the vehicle when the vehicle is located on a lane of a road. An instruction input unit is configured to allow a driver of the vehicle to input an instruction indicative of driver's recognized information in front of the vehicle. A target determining unit executes determination of a target for adjusting an interval with respect thereto based on a result of the monitor and on the instruction when the instruction is input from the instruction input unit thereto.

15 Claims, 10 Drawing Sheets

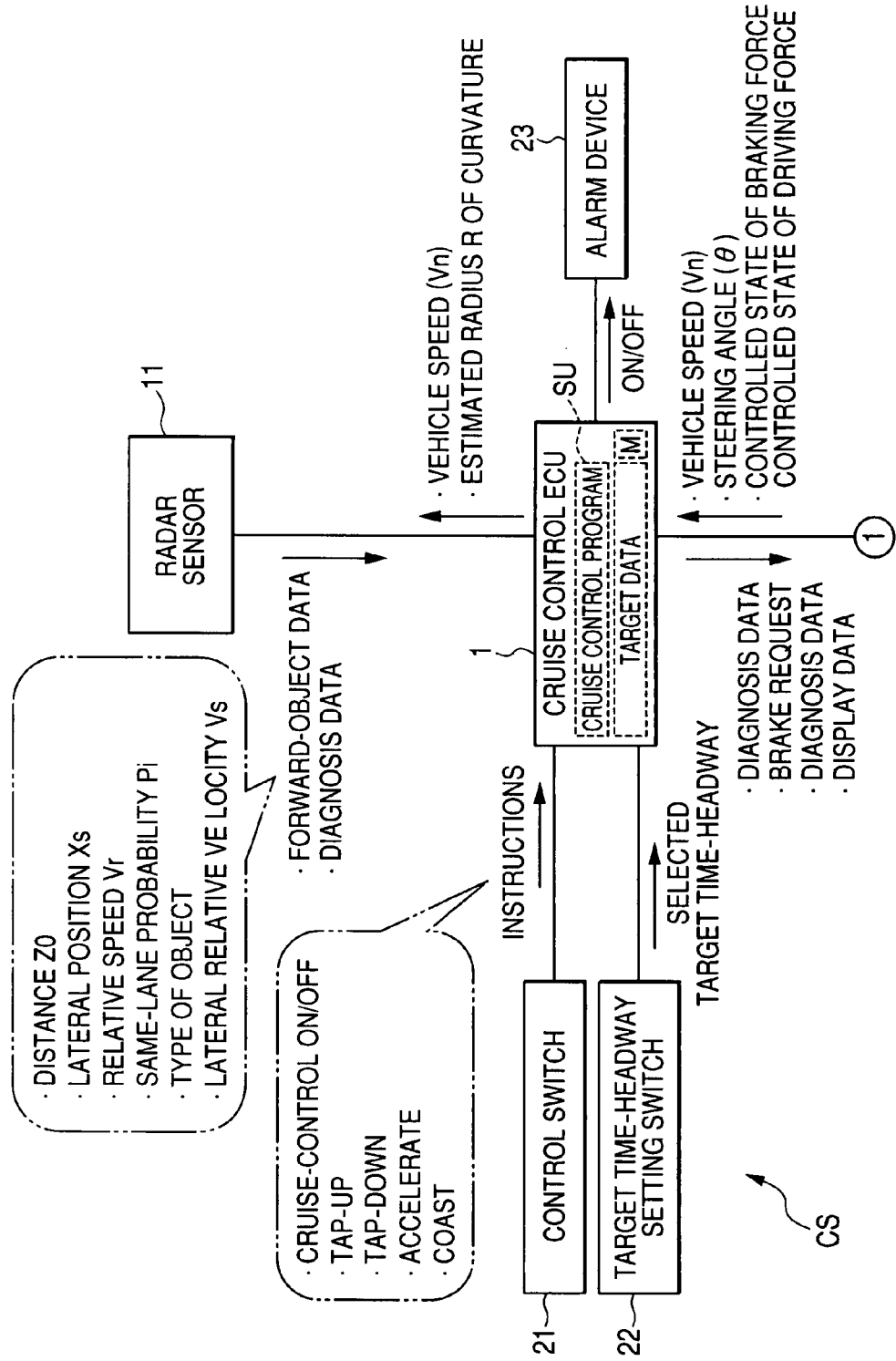

THIRD DRIVING MODE

FOURTH DRIVING MODE

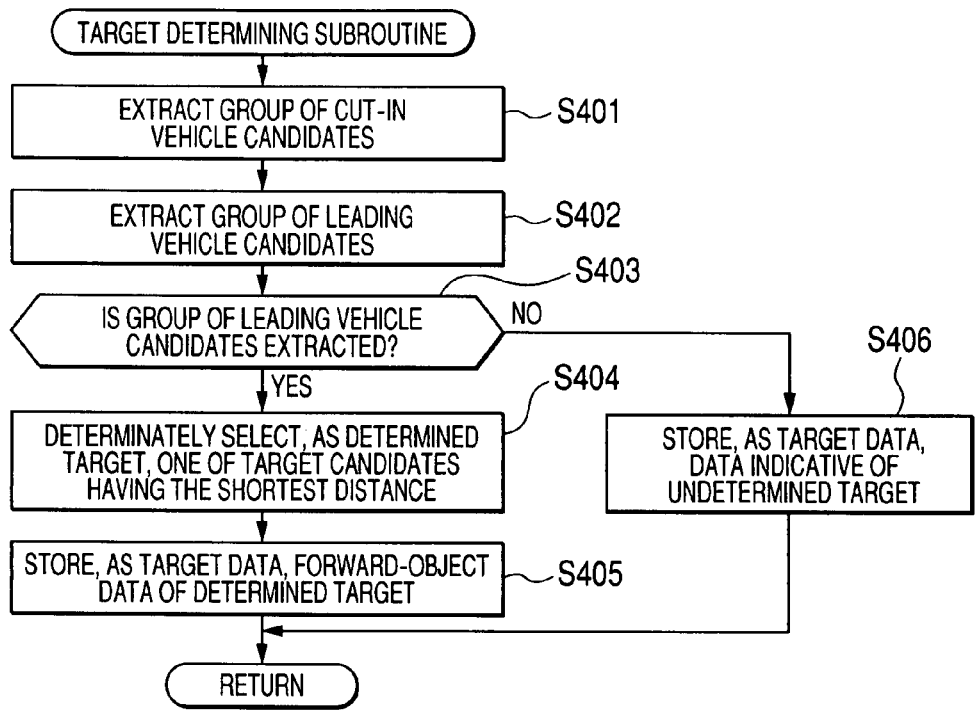
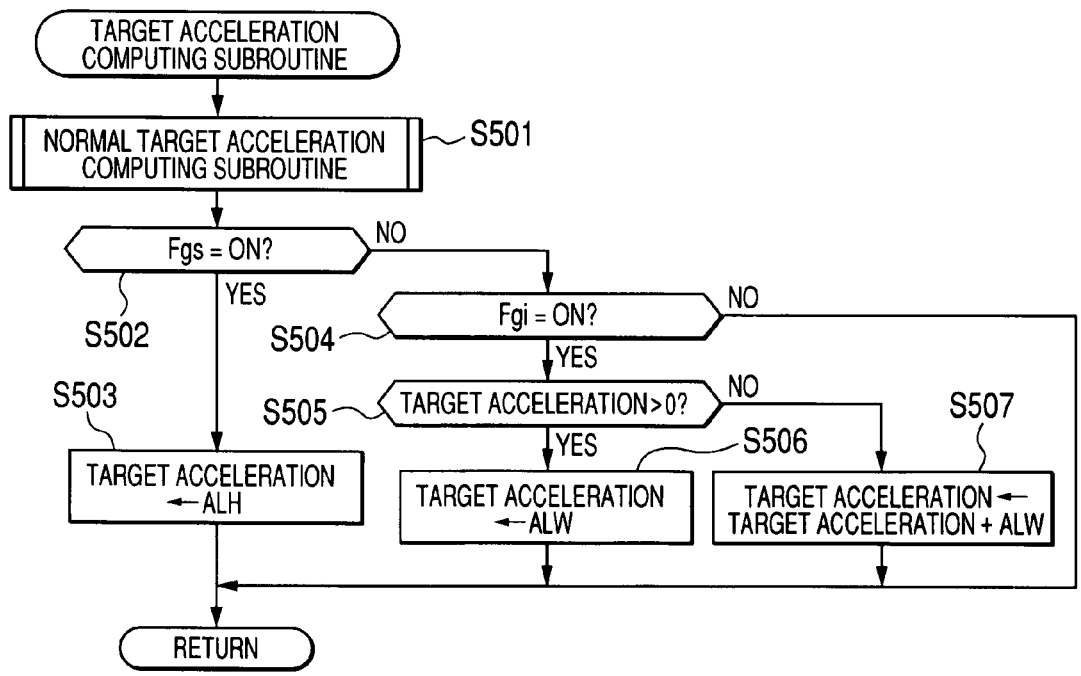

CRUISE CONTROL SYSTEM FOR DETERMINING OBJECT AS TARGET FOR CRUISE CONTROL

CROSS REFERENCE TO RELATED APPLICATIONS

This application is based on Japanese Patent Application 2006-318813 filed on Nov. 27, 2006. This application claims the benefit of priority from the Japanese Patent Application, so that the descriptions of which are all incorporated herein by reference.

FIELD OF THE INVENTION

The present invention relates to cruise control systems for automatically controlling the speed of a vehicle so as to adjust an interval with respect to a target therefor.

BACKGROUND OF THE INVENTION

Cruise control systems are designed to automatically control the speed of a vehicle. Specifically, when there are no leading vehicles, the cruise control system installed in a vehicle works to set the vehicle's speed to a desired constant speed determined by, for example, the driver.

When a leading vehicle is encountered, the cruise control system of the vehicle works to alter the vehicle speed to maintain a desired interval with respect to the leading vehicle while following the leading vehicle.

Some examples of such a cruise control system are disclosed in Japanese Patent Publication No. 2708751, Japanese Patent Application Publication No. H10-205366, and Japanese Patent Application Publication No. 2000-057498, which will be respectively referred to as "first patent publication", "second patent publication", and "third patent publication", hereinafter.

In the first patent publication, a radar installed in a vehicle running along a lane of a road scans radio signals over a predetermined scanning field so as to detect an object that the running vehicle faces. A cruise control system installed in the vehicle obtains the speed of the vehicle detected by the radar.

When the detected speed of the object exceeds zero, the cruise control system determines the object as a leading vehicle running in the same direction as the vehicle to thereby capture it as a target for cruise control of the vehicle.

In contrast, when the detected speed of the object is equal to or lower than zero, the cruise control system determines that the object is a standstill or moving in a direction opposing the running direction of the vehicle to thereby discount the object as a target for cruise control of the vehicle.

In the second patent publication, a radar installed in a vehicle running along a first lane of a road scans radio signals over a predetermined scanning field so as to measure both a first distance and a first angle between the vehicle and a first leading vehicle running in the same first lane as the vehicle and both a second distance and a second angle between the vehicle and a second leading vehicle running in a second lane adjacent to the first lane.

A cruise control system installed in the vehicle obtains a first yaw relative velocity between the vehicle and the first leading vehicle based on the measured first distance and the measured first angle therebetween. Similarly, the cruise control system obtains a second yaw relative velocity between the vehicle and the second leading vehicle based on the measured second distance and the measured second angle therebetween.

Then, the cruise control system determines whether the second vehicle cuts in front of the vehicle from the second lane based on the measured first and second yaw relative velocities.

When it is determined that the second vehicle cuts in front of the vehicle from the second lane based on the first and second measured yaw relative velocities, the cruise control system alters the vehicle speed to maintain a desired interval with respect to the cut-in second vehicle while following the cut-in second vehicle.

In the third patent publication, a radar installed in a vehicle running along one lane of a road scans radio signals over a predetermined scanning field so as to measure a distance between the vehicle and forward vehicles that the vehicle face.

A cruise control system installed in the vehicle obtains an integrated count value that is counted up with increase in a shift length of each of the forward vehicles with respect to the lane marker of the one lane of the road.

When it is determined that the integrated count value of one of the forward vehicles exceeds a predetermined threshold value, the cruise control system selects the corresponding one of the forward vehicles as a track target of the vehicle.

When the radar-measured distance between one of the forward vehicles and the vehicle is comparatively low, a comparatively low value is used as the predetermined threshold value. In contrast, when the radar-measured distance between one of the forward vehicles and the vehicle is comparatively high, a comparatively high value is used as the predetermined threshold value.

In addition, when the shift length of one of the forward vehicles with respect to the lane marker of the one road is smaller than a normal shift length for track-target leading vehicles, in other words, the forward vehicle is assumed to travel close to the lane marker, a comparatively low value is used as the predetermined threshold value.

In contrast, when the shift length of one of the forward vehicles with respect to the lane marker of the one lane of the road is longer than the normal shift length for track-target leading vehicles, in other words, the leading vehicle is assumed to travel away from the lane marker, a comparatively high value is used as the predetermined threshold value.

For example, when another vehicle cuts closely in front of the vehicle from another lane adjacent to the one lane as a forward vehicle, the comparatively low value set as the predetermined threshold value allows the cruise control system to immediately select the forward vehicle as the track target of the vehicle. The cruise control system can therefore immediately grasp another vehicle that is cutting in front of the vehicle from another lane adjacent to the one lane.

SUMMARY OF THE INVENTION

As an extension of the cruise-control functions disclosed in the first to third patent publications, it is desirable that, when a leading vehicle that a vehicle follows is stopped, a cruise control system installed in the vehicle brings the vehicle itself to a stop while keeping a desired interval with respect to the stopped leading vehicle. In this extension, the cruise control system need grasp a stopped leading vehicle as a target for cruise control of the vehicle in addition to a leading vehicle running in the same direction as the vehicle.

The cruise control system disclosed in the first patent publication, however, determines only leading vehicles running in the same direction as the vehicle as targets for cruise control of the vehicle even if the radar measures the stopped leading vehicle. This disables the cruise control system to determine stopped leading vehicles as the targets for cruise control of the vehicle.

In the cruise control system disclosed in the first patent publication, moreover, the radar measures stationary objects lying in the predetermined scanning field except for stopped leading vehicles, such as guardrails, road traffic signs, pedestrians, and the like. For this reason, when the cruise control system erroneously determines such a stationary object as a target for cruise control of the vehicle, the erroneous determination may cause the cruise control system to malfunction.

Reduction of the possibility for the cruise control system to erroneously determine such a stationary object as a target for cruise control of the vehicle as much as possible is needed to avoid such a cruise-control system malfunction.

The cruise control systems disclosed in the second and third patent publications are designed to determine whether another vehicle cuts in front of the vehicle from another lane adjacent to the one lane of the vehicle based on the yaw relative velocity between the vehicle and another vehicle or the shift length of another vehicle.

In the cruise control functions disclosed in the second and third patent publications, execution of the determination may be limited to cases where the yaw relative velocity between the vehicle and another vehicle or the shift length of another vehicle can be stably measured.

Specifically, when another vehicle tries to cut in front of a vehicle running one lane of a road from a position on another lane adjacent to the one lane; this position is comparatively far from the vehicle, the radar of the vehicle can detect another vehicle at an early stage of the cut-in thereof. Thus, the cruise control system installed in the vehicle can stably measure the yaw relative velocity between the vehicle and another vehicle or the shift length of another vehicle, and can change its target for cruise control from a leading vehicle to another vehicle in quick response to the start of the cut-in of another vehicle.

However, when another vehicle tries to cut in front of the vehicle running the one lane from a position on another lane adjacent to the one lane; this position is comparatively close to the vehicle, the radar of the vehicle may not detect another vehicle at an early stage of the cut-in thereof because the scanning field of the radar is limited. The cruise control system installed in the vehicle therefore may not stably measure the yaw relative velocity between the vehicle and another vehicle or the shift length of another vehicle. As a result, the cruise control system may not change its target for cruise control from a leading vehicle to another vehicle in quick response to the start of the cut-in of another vehicle.

Accordingly, in each of the conventional cruise control systems installed in a vehicle and described in a corresponding one of the first to third patent publications, whether to determine an object as a target for cruise control is carried out depending strongly on information of another vehicle, such as a leading vehicle or a cut-in vehicle, measured by a measuring device, such as a radar.

Thus, as described above, it may be difficult to avoid cruise-control system malfunctions set forth above, and/or it may be difficult to change a target for cruise control from a leading vehicle to another vehicle in quick response to the start of another vehicle cutting in front of the vehicle.

In view of the circumstances set force above, an object of a first aspect of the present invention is to provide cruise control systems installed in a vehicle; these cruise control systems are capable of reducing the strong dependence of the target determination on information of another vehicle, such as a leading vehicle or a cut-in vehicle, measured by a measuring device, such as a radar.

A specific object of a second aspect of the present invention is to provide cruise control systems installed in a vehicle; these cruise control systems are capable of avoiding cruise-control system malfunctions set forth above.

Another specific object of a third aspect of the present invention is to provide cruise control systems installed in a vehicle, which are capable of changing a target for cruise control from a leading vehicle to another vehicle in quick response to the start of another vehicle cutting in front of the vehicle.

According to one aspect of the present invention, there is provided a cruise control system installed in a vehicle. The cruise control system includes a monitoring unit to monitor a region predetermined in front of the vehicle when the vehicle is located on a lane of a road. The cruise control system includes an instruction input unit configured to allow a driver of the vehicle to input an instruction indicative of driver's recognized information in front of the vehicle. The cruise control system includes a target determining unit to execute determination of a target for adjusting an interval with respect thereto based on a result of the monitor and on the instruction when the instruction is input from the instruction input unit thereto.

BRIEF DESCRIPTION OF THE DRAWINGS

Other objects and aspects of the invention will become apparent from the following description of embodiments with reference to the accompanying drawings in which:

FIG. 1A is a block diagram schematically illustrating an example of part of the overall structure of a cruise control system according to an embodiment of the present invention;

FIG. 7 is a flowchart schematically illustrating a target determining subroutine to be called by the cruise control ECU during execution of the cruise control task illustrated in FIG. 5;

FIG. 8 is a flowchart schematically illustrating a target acceleration computing subroutine to be called by the cruise control ECU during execution of the cruise control task illustrated in FIG. 5;

DETAILED DESCRIPTION OF EMBODIMENTS OF THE INVENTION

Figure 1B:
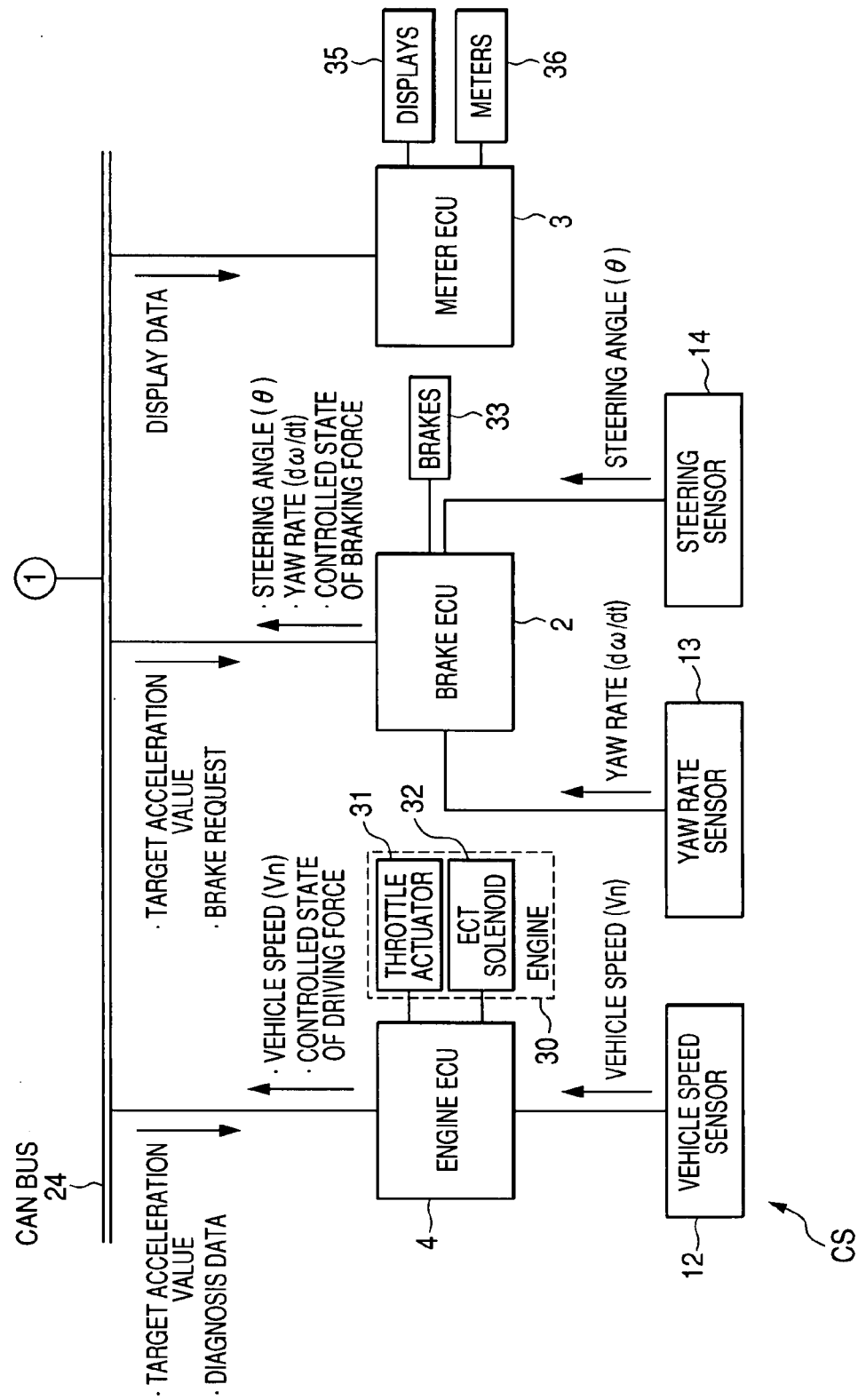
FIG. 1B is a block diagram schematically illustrating an example of the remaining part of the overall structure of the cruise control system according to the embodiment of the present invention.

An embodiment of the present invention will be described hereinafter with reference to the accompanying drawings. In the drawings, identical reference characters are utilized to identify identical corresponding components.

Referring to FIGS. 1A and 1B, an example of the overall structure of a cruise control system CS installed in a vehicle V is illustrated.

Specifically, the cruise control system CS includes a cruise control ECU 1, a brake ECU 2, a meter ECU 3, and an engine ECU 4. The cruise control system CS also includes an obtaining unit such as a radar sensor 11, vehicle speed sensors 12, a yaw rate sensor 13, a steering sensor 14, a control switch 21, a target time-headway setting switch 22, an alarm device 23, and a CAN (Controller Area Network) bus 24. The cruise control system CS further includes an engine 30 equipped with an electronic throttle actuator 31 and an electronic control transmission (ECT) 32 with solenoids. The cruise control system CS includes brakes 33, displays 35, and meters 36.

The ECUs 1 to 4 are communicably connected to each other via the CAN bus 24 as an example of communication buses.

When the vehicle V is running along one lane of a road, the control system CS is designed to execute the following controls under the following first to fourth driving modes while maintaining the speed of the vehicle V within a predetermined range of 0 [km/h] to approximately 100 [km/h]. Note that the controls described hereinafter under the first to fourth driving modes collectively means "cruise control (cruise control function)".

Figure 2C:
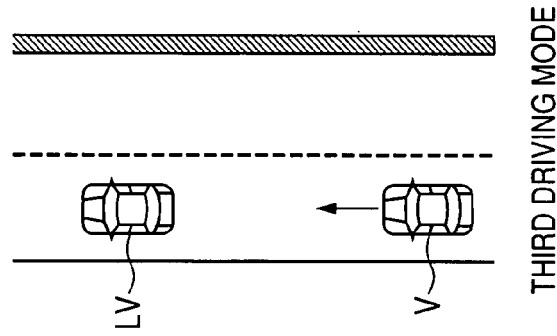
FIG. 2C is a view schematically illustrating a situation in which the vehicle is driving to approach to a stopped vehicle under a third driving mode according to the embodiment.
Figure 2B:
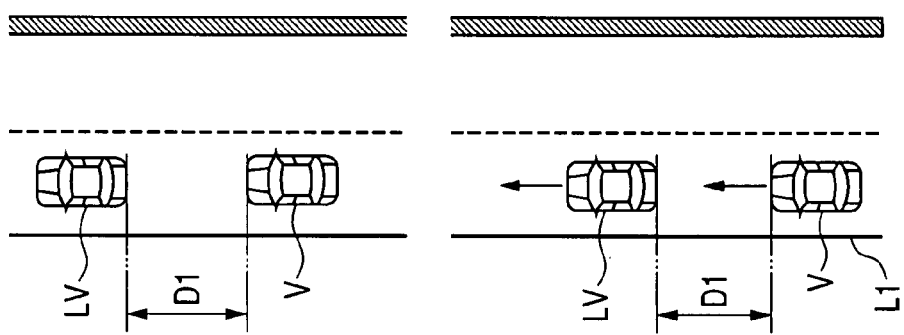
FIG. 2B is a view schematically illustrating a situation in which the vehicle is driving so as to keep a desired interval with respect to a leading vehicle under a second driving mode according to the embodiment.
Figure 2A:
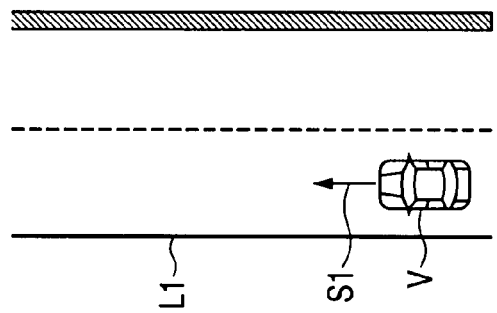
FIG. 2A is a view schematically illustrating a situation in which a vehicle is driving at a constant speed under a first driving mode according to the embodiment.

As illustrated in FIG. 2A, under the first driving mode in which there are no leading vehicles along the one lane L1 from the driver's view, the control system CS is designed to set the vehicle's speed to a desired constant speed S1 determined by, for example, the driver. This control means "constant-speed control".

As illustrated in FIG. 2B, under the second driving mode in which the vehicle V wants to follow a leading vehicle LV during execution of the constant-speed control, the control system CS is designed to:

determine the leading vehicle LV as a target for cruise control of the vehicle V;

alter the vehicle speed to maintain a desired interval DI with respect to the target (leading vehicle) LV while following the leading vehicle LV; and bring the vehicle V to a stop while keeping the desired interval DI when the leading vehicle LV is stopped so as to maintain the stopped state of the vehicle V.

This control means "inter-vehicle distance maintaining control".

Figure 2D:
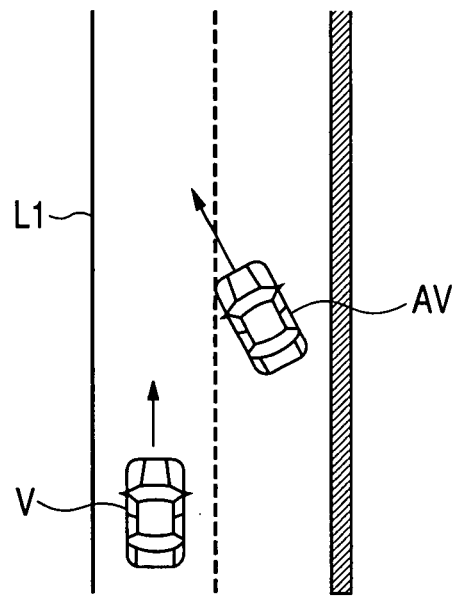
FIG. 2D is a view schematically illustrating a situation in which, when the vehicle is driving, another vehicle is cutting in front of the vehicle under the third driving mode according to the embodiment.

Under the third driving mode in which the vehicle V approaches a stopped leading vehicle LV during execution of the constant-speed control (see FIG. 2C) or another vehicle AV cuts in front of the vehicle V from a position comparatively close to the vehicle V on another lane adjacent to the one lane L1 (see FIG. 2D), the cruise control system CS is designed to:

decelerate the vehicle V when receiving an instruction from the driver to select, as a target candidate for cruise control of the vehicle V, the stopped leading vehicle or the cut-in vehicle; or hold down acceleration of the vehicle V.

This control of deceleration of the vehicle V means "deceleration control", and this control of holding down of acceleration of the vehicle V means "acceleration holding-down control".

After the deceleration control or acceleration holding-down control, when receiving a target selection instruction from the driver to select, as a target candidate for cruise control of the vehicle V, the stopped leading vehicle or the cut-in vehicle, the cruise control system CS is designed to:

alter the vehicle speed to maintain a desired interval with respect to the target while following the target for cruise control when the cut-in vehicle is selected as the target; or bring the vehicle V to a stop while keeping the desired interval with respect to the stopped leading vehicle when the stopped leading vehicle is selected as the target for cruise control.

Note that the target selection instruction from the driver to select, as a target for cruise control of the vehicle V, the stopped leading vehicle will be referred to as "stopped-vehicle selection instruction" hereinafter. In addition, note that the target selection instruction from the driver to select, as a target for cruise control of the vehicle V, the cut-in vehicle will be referred to as "cut-in vehicle selection instruction" hereinafter.

Note that, when starting the deceleration control or acceleration holding-down control in response to receiving the stopped-vehicle selection instruction from the driver, the cruise control system CS continuously executes the deceleration control or acceleration holding-down control until the stopped leading vehicle is determinately selected as the target for cruise control.

During continuous execution of the deceleration control or acceleration holding-down control, when an accelerator pedal of the vehicle V is operated (depressed) by the driver, the cruise control system CS terminates the execution of the deceleration control or the acceleration holding-down control, thus shifting to execution of the constant-speed control or the inter-vehicle distance maintaining control.

Note that, when starting the deceleration control or acceleration holding-down control in response to receiving the cut-in vehicle selection instruction from the driver, the cruise control system CS continuously executes the deceleration control or acceleration holding-down control until another vehicle cutting in front of the vehicle V is determinately selected as a new target for cruise control. The new target for cruise control has a distance from the vehicle V shorter than that of the previous target therefrom until just before the receipt of the cut-in vehicle selection instruction.

During continuous execution of the deceleration control or acceleration holding-down control, when the accelerator pedal of the vehicle V is depressed by the driver, the cruise control system CS terminates the execution of the deceleration control or the acceleration holding-down control, thus shifting to execution of the constant-speed control or the inter-vehicle distance maintaining control.

Figure 2E:
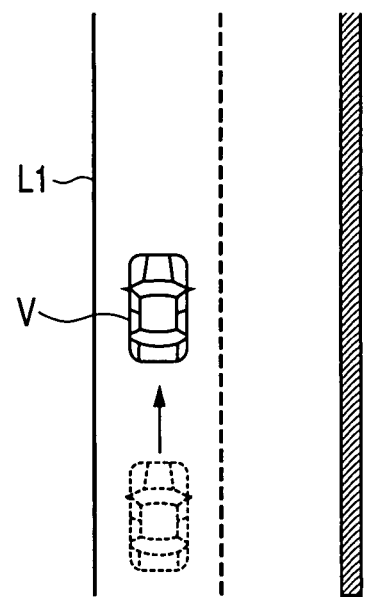
FIG. 2E is a view schematically illustrating a situation in which the vehicle starts to drive under a fourth driving mode according to the embodiment.

As illustrated in FIG. 2E, under the fourth driving mode in which the cruise control system CS maintains the stopped state of the vehicle V, when receiving an instruction from the driver to permit the vehicle V to start, the cruise control system CS is designed to start the vehicle V. This control of start of the vehicle V means "start control". Note that the instruction from the driver to permit the vehicle V to start will be referred to as "start-permission instruction" hereinafter.

As the radar sensor 11, a laser radar for scanning laser beams is used. Specifically, the radar sensor 11 of this laser radar type is mounted onto a front bumper at the front end of the vehicle V or attached close thereto.

The radar sensor 11 is connected to the cruise control ECU 1. The radar sensor 11 is designed to scan laser beams over a predetermined scanning field toward the front of the vehicle V, receive a plurality of reflected waves, and detect at least one object lying in the predetermined scanning field based on intensities of the plurality of received reflected waves; some of these plurality of reflected waves being generated based on reflection of at least some of the plurality of laser beams from the at least one object.

The radar sensor 11 is also designed to:

periodically measure various items of forward-object data associated with the at least one object detected thereby;

send the periodically measured various items of the forward-object data to the cruise control ECU 1; and monitor input and output items of data thereto and therefrom to detect errors; and send the monitor result as diagnosis data to the cruise control ECU 1.

Note that, in place of the laser radar, other types of radar sensors, such as a millimeter-wave laser designed to scan millimeter-waves over the predetermined scanning field toward the front of the vehicle V, can be used.

As illustrated in FIG. 1A, assuming that the radar sensor 11 detects an at least one object OB, the items of the forward-object data include:

a distance Z0 between the vehicle V and the at least one object OB detected by the radar sensor 11;

a lateral (horizontal) position Xs of the at least one object OB;

a relative velocity Vr between the vehicle V and the at least one object OB;

a type of the at least one object OB;

a same-lane probability Pi of the at least one object OB being present on the same lane as the vehicle V; and a lateral relative velocity Vs.

Note that, in the laser radar 11, an X and Z (XZ) coordinate system with its origin O at the mount position or laser-beam output point of the radar sensor 11 onto the front end of the vehicle V have been defined. The Z-axis of the XZ coordinate system represents the forward direction of the vehicle V, and the X-axis of the XZ coordinate system represents a direction orthogonal to the X-axis and parallel to the direction of width of the vehicle V.

The distance Z0 between a center portion CE of the at least one object OB and the origin O of the radar sensor 11 (vehicle V) in the XZ coordinate system detected by the radar sensor 11 represents a value on the Z axis on the plane of the XZ coordinate system.

Figure 3:
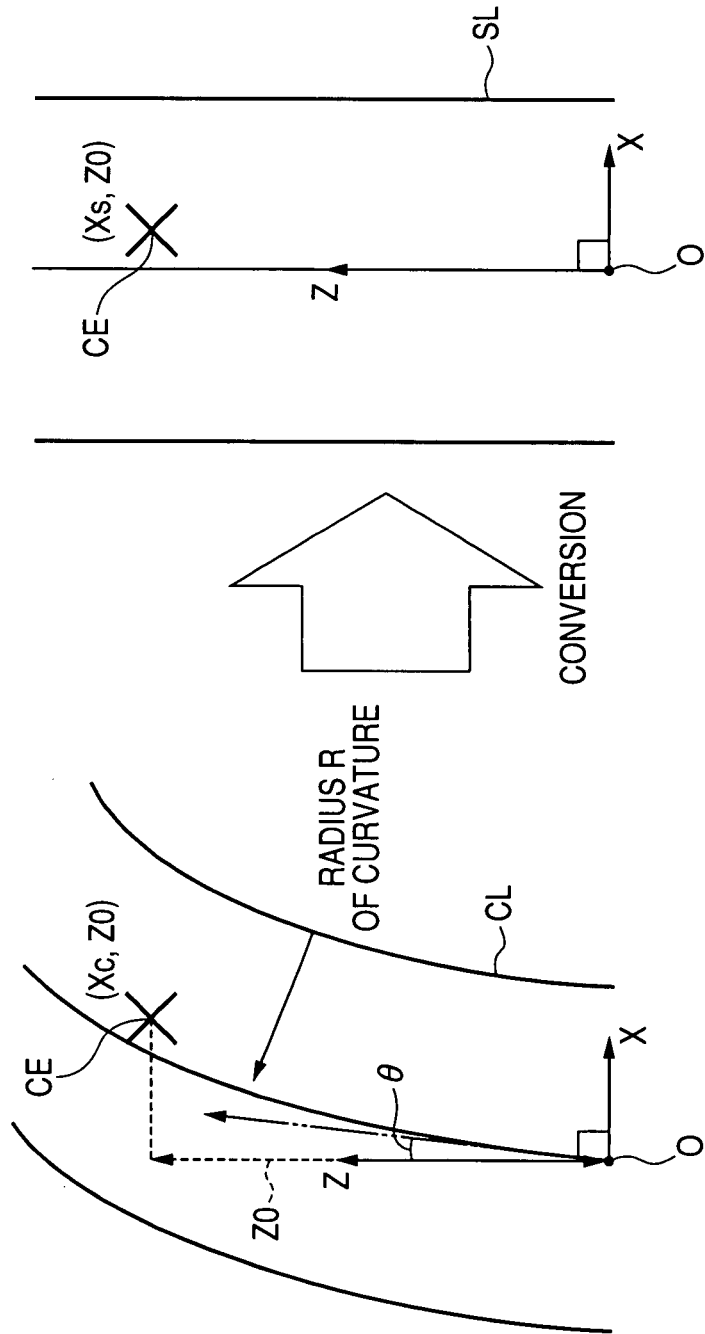
FIG. 3 is a view schematically illustrating the conversion between a curved line and a straight line according to the embodiment.

For example, as illustrated in FIG. 3, the lateral position Xs of the center portion CE of the at least one object OB on the X-axis of the XZ coordinate system is obtained by:

calculating a lateral position Xc on a curved lane CL based on the distance Z0 and a direction of the center portion CE of the at least one object from the origin O of the radar sensor 11 of the vehicle V; and converting the lateral position Xc on the curved lane CL into the lateral position Xs on a straight lane SL based on the radius R of curvature of the vehicle V estimated by the cruise control ECU 1 using a steering angle θ measured by the steering sensor 14.

Specifically, the radius R of curvature of the vehicle V can be estimated by the cruise control ECU 1 in accordance with the following equation [1] based on the current vehicle speed Vn detected by each of the vehicle speed sensors 12 and on the steering angle θ measured by the steering sensor 14:

$$R = K \times (1 + \alpha \times Vn^2 + \beta \times Vn^3)/\theta \quad [1]$$

The lateral position Xs of the at least one object OB on the straight lane SL can be calculated in accordance with the following equation [2] based on the estimated radius R of curvature of the vehicle V:

$$Xs = Xc - Z0^2/(2R) \quad [2]$$

Specifically, the position of the center portion CE of the at least one object OB on the X-Z coordinate system are represented as the X and Z coordinates (Xs, Z0) on the straight lane SL.

The relative velocity Vr represents a relative velocity between the vehicle V and the at least one object OB. Specifically, when the at least one object OB and the vehicle V approach towards each other, a positive sign "−" is assigned to the relative velocity Vr. In contrast, when the at least one object OB and the vehicle V move apart from each other, a negative sign "+" is assigned to the relative velocity Vr.

The type of the at least one object OB serves as an identifier representing whether the at least one object OB is a stationary object or a moving object; this type of the at least one object OB is determined based on the magnitude of the absolute value of the relative velocity Vr.

The same-lane probability Pi represents the probability of the at least one object OB existing on the same lane as the vehicle V can be obtained by the radar sensor 11 based on a previously prepared probability map in the radar sensor 11 and on the position (Xs, Z0) of the at least one object OB. How to obtain the same-lane probability Pi based on the previously prepared probability map and on the position (Xs, Z0) of the at least one object OB has been included in, for example, U.S. Pat. Nos. 6,484,087 B2 and 6,927,699. Because these U.S. patents are each assigned to the same assignee as that of this application, disclosures of which are incorporated herein by reference.

The lateral relative velocity Vs represents a relative velocity of the at least one object OB with respect to the vehicle V in the X axis. For example, when the at least one object OB moves toward the right of the Z axis in the X direction, a positive sign "+" is assigned to the lateral relative velocity Vs. In contrast, when the at least one object OB moves toward the left of the Z axis in the X direction, a negative sign "−" is assigned to the lateral relative velocity Vs.

Each of the vehicle speed sensors 12 is, for example, provided close to a corresponding one of rolling wheels of the vehicle V and connected to the engine ECU 4. Each of the vehicle speed sensors 12 is configured to generate a train of vehicle-speed pulses whose pulse repetition rate variably corresponds to the rotational rate of the corresponding one of the rolling wheels. Each of the vehicle speed sensors 12 is also operative to calculate a current vehicle speed Vn based on the generated train of vehicle-speed pulses, and to send, to the engine ECU 4, the calculated current vehicle speed Vn.

The yaw rate sensor 13 is connected to the brake ECU 2. The yaw rate sensor 13 works to measure a vehicle's turning rate (yaw rate) around a Y axis orthogonal to the plane of the XZ coordinate system. The yaw rate can be represented by "dω/dt".

The steering sensor 14 is connected to the brake ECU 2. The steering sensor 14 works to measure a steering angle θ of each of the steered wheels of the vehicle V or a steering wheel SW (see FIG. 4A) thereof from its neutral position at which the steering angle θ is 0 degrees and the vehicle V is directed straight ahead.

The yaw rate sensor 13 and the steering sensor 14 are operative to send, to the brake ECU 2, the measured yaw rate dω/dt and the measured steering angle θ in electric signals.

The control switch 21 and the target time-headway setting switch 22 are arranged on or close to the steering wheel and connected to the cruise control ECU 1. The target time-headway setting switch 22 will be referred to simply as "setting switch" 22 hereinafter.

Figure 4A:
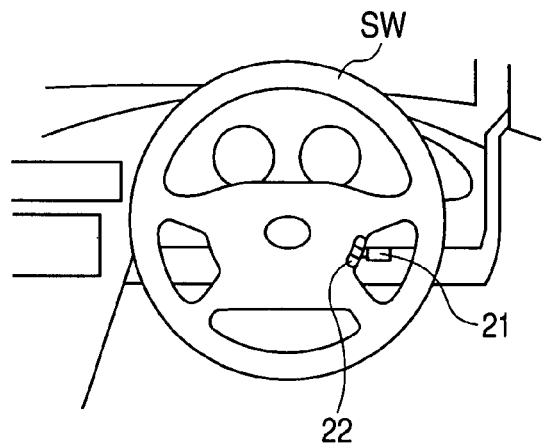
FIG. 4A is a view schematically illustrating an example of the arrangement of a control switch of the cruise control system according to the embodiment and that of the arrangement of a time-headway setting switch thereof.

For example, as illustrated in FIG. 4A, the control switch 21 is arranged at the right side of a steering shaft of the steering wheel SW opposing an instrument panel of the vehicle V in view of the driver. The setting switch 22 is directly mounted on the right side of a center portion of the steering wheel SW.

The control switch 21 allows the driver to send, to the cruise control ECU 1, an instruction for activating or deactivating the cruise control function of the cruise control ECU 1. The control switch 21 allows the driver to send, to the cruise control ECU 1, an instruction for setting a desired vehicle speed for the constant-speed control, and an instruction for setting an upper limit of the vehicle speed Vn during execution of the inter-vehicle distance maintaining control.

The control switch 21 also allows the driver to send, to the control ECU 1, an instruction for accelerating or decelerating the vehicle V without operating the accelerator pedal. The control switch 21 further allows the driver to send, to the cruise control ECU 1, an instruction for returning the cruise control ECU 1 from a state in which no cruise control function is carried out to that in which the cruise control function is carried out.

The setting switch 22 allows the driver to send, to the control ECU 1, an instruction for selecting one of a first target time-headway, a second target time-headway, and a third target time-headway during the execution of the inter-vehicle distance maintaining control.

For example, the first target time-headway is set to a comparatively long time-headway of "2.4 seconds", the second target time-headway is set to a middle time-headway of "2.0 seconds", and the third target time-headway is set to a short time-headway of "1.8 seconds".

Figure 4B:
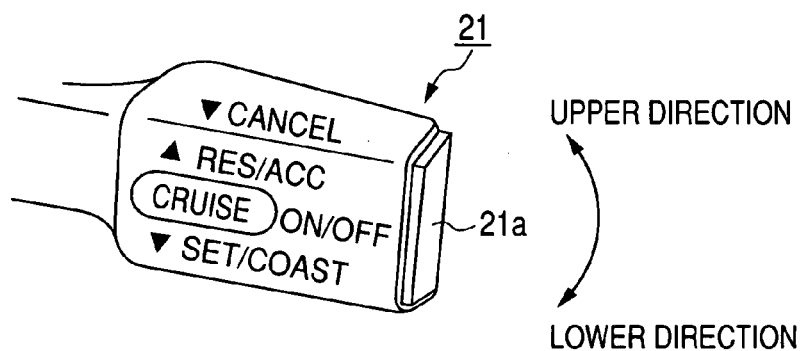
FIG. 4B is an enlarged perspective view schematically illustrating an example of the structure of the control switch according to the embodiment.

FIG. 4B schematically illustrates an example of the structure of the control switch 21.

Specifically, in the embodiment, the control switch 21 is, for example, a momentary lever switch. The control switch 21 is movable in upper and lower directions in the vehicle V illustrated in FIG. 4B.

The control switch 21 is equipped with an alternate main switch (push-button switch) 21a attached to one end of the control switch 21. When the main switch 21a is pressed down from a normal position to ON position, an instruction is sent to the cruise control ECU 1 so that a power source installed in the cruise control ECU 1 for the cruise control function is turned on. The turning-on of the power source for the cruise control function enables the cruise control ECU 1 to shift its operation mode to cruise-control ready mode in which the cruise control ECU 1 waits for executing the cruise control function.

When the main switch 21a kept at the ON position is pressed down again so that it returns to the normal position, an instruction is sent to the cruise control ECU 1. The instruction allows the power source installed in the cruise control ECU 1 for the cruise control function to be turned off. The turning-off of the power source for the cruise control function enables the cruise control ECU 1 to shift its operation mode to cruise-control stop mode in which the cruise control ECU 1 does not wait for executing the cruise control function.

Specifically, in the cruise-control ready mode, when the driver lowers the control switch 21 after the desired vehicle speed for the constant-speed control or one of the first to third target time-headways has been determined, an instruction is sent to the cruise control ECU 1. The instruction allows the cruise control ECU 1 to be shift its operating mode from the cruise-control ready mode to cruise-control mode (see "SET" in FIG. 4B). This operation of the control switch 21 will be referred to "tap-down operation".

Under the cruise control function being set, when wanting to accelerate the determined vehicle speed, the driver pulls up the control switch 21 at desired times, which sends, to the cruise control ECU 1, an instruction for the ECU 1 to accelerate the current vehicle speed Vn corresponding to the desired times. This operation of the control switch 21 will be referred to "tap-up operation".

Under the cruise control function being set, when wanting to decelerate the determined vehicle speed, the driver lowers the control switch 21 (executes the tap-down operation) at desired times, which sends, to the cruise control ECU 1, an instruction for the ECU 1 to decelerate the current vehicle speed Vn corresponding to the desired times.

Under the cruise control function being set, when the driver depresses (operates) a brake pedal of the vehicle V, an instruction is sent to the cruise control ECU 1 so that the cruise control ECU 1 cancels the cruise control function (see "CANCEL" in FIG. 4B).

Under the cruise control function being canceled state, when the driver pulls up the control switch 21 (executes the tap-up operation), which sends, to the cruise control ECU 1, an instruction for the ECU 1 to resume the cruise control function in its state immediately before the brake pedal being depressed (see "RES" in FIG. 4B). This operation of the control switch 21 will be referred to as "resume operation" illustrated in FIG. 4B.

When wanting to send, to the cruise control ECU 1, the stopped-vehicle selection instruction or the cut-in vehicle selection instruction while starting acceleration or deceleration of the vehicle V, the driver lowers the control switch 21 and has kept it lowered for equal to or greater than a predetermined period of time, such as approximately 0.5 seconds (see "COAST" in FIG. 4B). This operation of the control switch 21 will be referred to as "coast operation" illustrated in FIG. 4B.

When wanting to send, to the cruise control ECU 1, the start-permission instruction, the driver pulls up the control switch 21 and has kept it pulled-up for equal to or greater than a predetermined period of time, such as approximately 0.5 seconds (see "ACC" in FIG. 4B). This operation of the control switch 21 will be referred to as "acceleration operation" illustrated in FIG. 4B.

When an instruction sent from the control switch 21 by the driver's pulling-up of the control switch 21 is received by the cruse control ECU 1, the cruise control ECU 1 determines whether the received instruction is the tap-up operation or the acceleration operation based on the duration of the control switch 21 being kept pulled-up.

Similarly, when an instruction sent from the control switch 21 by the driver's lowering of the control switch 21 is received by the cruse control ECU 1, the cruise control ECU 1 determines whether the received instruction is the tap-down operation or the coast operation based on the duration of the control switch 21 being kept lowered.

Specifically, the driver lowers the control switch 21 and has kept it lowered for equal to or greater than the predetermined period of time (approximately 0.5 seconds). This allows the stopped-vehicle selection instruction or the cut-in vehicle selection instruction to be output to the cruise control ECU 1. The cruise control ECU 1 therefore easily selects a stopped vehicle or a cut-in vehicle as a target candidate for cruise control.

In other words, when the driver instantaneously lowers the control switch 21 so that the duration of the control switch 21 being kept lowered is shorter than the predetermined period of time (approximately 0.5 seconds), the cruise control ECU 1 does not start to execute the deceleration control or acceleration holding-down control. This makes it possible to prevent the cruise control ECU 1 from erroneously starting to execute the deceleration control or acceleration holding-down control despite the driver's intensions.

Figure 4C:
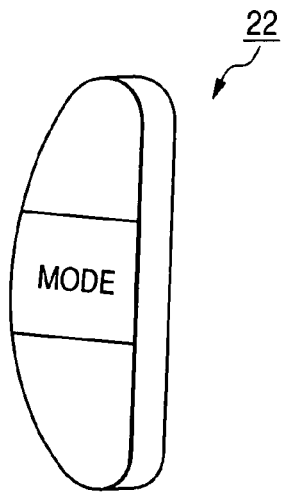
FIG. 4C is an enlarged perspective view schematically illustrating an example of the structure of the time-headway setting switch according to the embodiment.
Figure 5:
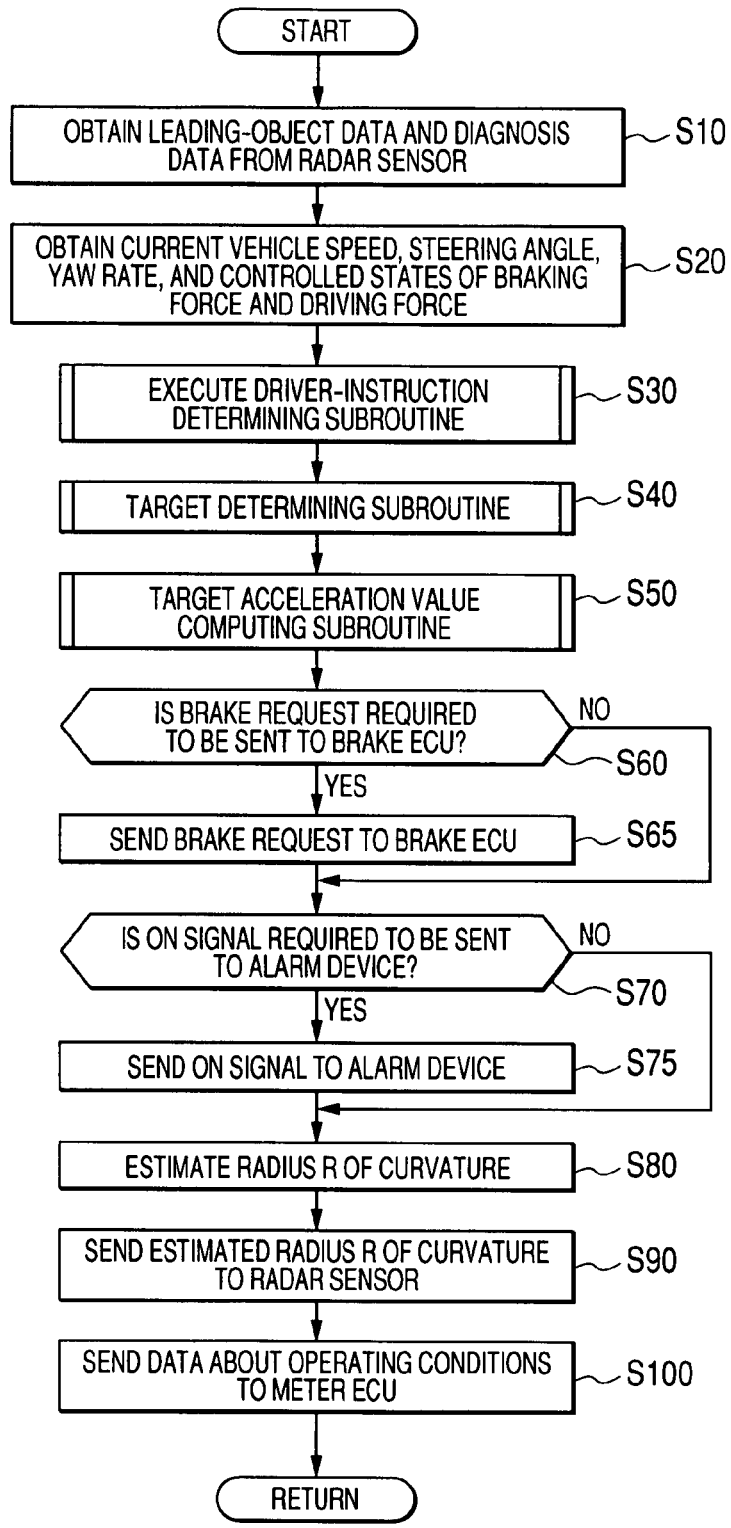
FIG. 5 is a flowchart schematically illustrating a cruise control task to be executed by a cruise control ECU illustrated in FIG. 1A.

FIG. 4C schematically illustrates an example of the structure of setting switch 22. The setting switch 22 is, for example, a touch-panel switch or a push-button switch. The setting switch 22 allows the driver to select any one of the first to third target-time headways.

Specifically, the first target time-headway of 2.4 seconds has been set as a default value during the initial condition of the engine 30.

During the first target time-headway of 2.4 seconds being set as the default value, when the setting switch 22 is pressed (touched) once by the driver, an instruction is sent to the cruise control ECU 1 from the setting switch 22; this instruction enables the first target time-headway of 2.4 seconds to be switched to the second target time-headway of 2.0 seconds.

During the second target time-headway of 2.0 seconds being set, when the setting switch 22 is pressed (touched) once by the driver, an instruction is sent to the cruise control ECU 1 from the setting switch 22; this instruction enables the second target time-headway of 2.0 seconds to be switched to the third target time-headway of 1.8 seconds.

Thereafter, during the third target time-headway of 1.8 seconds being set, when the setting switch 22 is pressed (touched) once by the driver, an instruction is sent to the cruise control ECU 1 from the setting switch 22; this instruction enables the third target time-headway of 1.8 seconds to be returned to the first target time-headway of 2.4 seconds.

The alarm device 23 is connected to the cruise control ECU 1. The alarm device 23 is operative to give an alarm every time an ON signal is sent thereto from the cruise control ECU 1.

Specifically, the cruise control ECU 1 is programmed to output the ON signal every time it is determined that a more deceleration (negative acceleration) exceeding a maximum deceleration (negative acceleration) previously determined to be creatable by the cruise control function for, for example, safety of occupants in the vehicle V is required to avoid a collision with a target for cruise control. The cruise control ECU 1 is also programmed to output the ON signal every time it is determined that the vehicle V can start during the vehicle V being kept stopped.

Referring to FIGS. 1A and 1B, the cruise control ECU 1, the brake ECU 2, the meter ECU 3, and the engine ECU 4 are communicably coupled to each other via the CAN bus 24 so as to share various types of data required for integral control of the vehicle V and to carry out the integral control of the vehicle using the shared various types of data. Each of the ECUs 1 to 4 is designed as, for example, a computer circuit. Specifically, each of the ECUs 1 to 4 consists of a CPU, a storage unit SU including a working memory (RAM) and a program memory (ROM), an input/output interface (I/O interface), and a communication interface for communicating with external devices therethrough.

The brake ECU 2 is connected to the brakes 33 each for applying braking force to a corresponding one of the wheels of the vehicle V so as to slow down it.

Specifically, to the brake ECU 2, the yaw rate dω/dt and the steering angle θ are input from the respective sensors 13 and 14. In addition, a target acceleration and a brake request generated by the cruise control ECU 1 are input to the brake ECU 2 in electric signals.

The brake ECU 2 is programmed to execute allocated tasks associated with the cruise control function to thereby control the braking force to be applied from each of the brakes 9b to a corresponding one of the wheels to thereby adjusting the acceleration of the vehicle V to the target acceleration. The brake ECU 2 is also programmed to send information indicative of the controlled state of the braking force for each of the brakes to the CAN bus 24 together with the yaw rate dω/dt and the steering angle θ.

The meter ECU 3 is connected to the displays 35 and the meters 36. The displays 35 and meters 36 are so arranged as to be visibly recognizable by at least the driver. For example, they are arranged to the instrumental panel of the vehicle V.

The displays 35 provide at least the driver visible various items of information associated with the driving conditions (operating conditions) of the vehicle V. The meters 36 include various warning lights, such as engine-oil level warning light, brake warning light, and so on, that light up when corresponding problems occur, respectively.

The meter ECU 35 receives various items of data to be displayed on the displays 35 and/or on the various warning lights of the meters 36 sent from at least one of the ECUs 1 to 3 via the CAN bus 24. The meter ECU 35 controls the displays 35 to display at least some of the various items of data in visible format, and controls at least one of the various warning lights of the meters 36 to turn on a corresponding warning light based on a corresponding at least one of the various items of data.

The engine ECU 4 is designed to control a driving force to be applied to a drive shaft (driving wheels) of the vehicle V, and operative to receive the current vehicle speed Vn from each of the vehicle speed sensors 12, and receive the target acceleration, and the diagnosis data via the CAN bus 24. The engine ECU 4 executes allocated tasks associated with the cruise control function based on the received current vehicle speed Vn, the diagnosis data, and the target acceleration.

Specifically, the engine ECU 4 is connected to the electronic throttle actuator 31 and the electronic control transmission 32. The electronic throttle actuator 31 is mechanically linked to a throttle valve disposed in an intake pipe of the engine 30 to be rotatable therein. The electronic control transmission 32 has a gear train changeable by the solenoids. The electronic control transmission 32 is configured to take torque from the engine 30 and control the transfer of the torque to the drive shaft of the vehicle V or the drive wheels as the driving force while changing the gear ratio of the gear train.

Based on the target acceleration, the engine control ECU 4 therefore works to:

control the electronic throttle actuator 31 to control the rotational position of the throttle valve to thereby adjust the amount of air-fuel mixture that reaches cylinders of the engine 30; and control the electronic control transmission 32 to control the solenoids to thereby change the gear ratio.

These controls of the electronic actuator 31 and the electronic control transmission 32 by the engine ECU 4, and the control of the brakes 33 by the brake ECU 2 allow the driving force and the current vehicle Vn of the vehicle V to be controlled.

The engine ECU 4 also works to send information indicative of the controlled state of the driving force in which the engine 30 runs at an idle or the engine 30 of the vehicle V runs at the constant speed or at a target speed required to maintain the desired interval with respect to the target.

The cruise control ECU 1 is operative to receive:

the forward-object data and the diagnosis data sent from the radar sensor 11;

the instructions sent from the control switch 21; and the current vehicle speed Vn, the steering angle θ, the yaw rate dω/dt, the controlled state of the braking force for each of the brakes 32, and the controlled state of the driving force sent via the CAN bus 24.

The cruise control ECU 1 is also operative to execute the cruise control function based on the received forward-object data, the diagnosis data, the instructions, the current vehicle speed Vn, the steering angle θ, the yaw rate dω/dt, the controlled state of the braking force for each of the brakes 32, and the controlled state of the driving force.

The execution of the cruise control function allows the target acceleration of the vehicle V, the brake request, and the various items of display data to be generated by the cruise control ECU 1. The cruise control ECU 1 is operative to send, to the CAN bus 24, the target acceleration of the vehicle V, the brake request, and the various items of the display data.

Next, operations of the cruise control system CS according to the embodiment will be described hereinafter.

FIGS. 5 to 10 schematically illustrate a cruise control task to be executed by the cruise control ECU 1 in accordance with at least one cruise control program stored in the storage unit SU for implementing the cruise control function will be described hereinafter with reference to FIGS. 5 to 10. The cruise control task is started every time the driver lowers the control switch 21 (executes the tap-down operation) in the cruise-control ready mode after the desired vehicle speed for the constant-speed control task or one of the first to third target time-headways has been determined.

When launching the cruise control program, the cruise control ECU 1 obtains the forward-object data and the diagnosis data from the radar sensor 11 in step S10.

Next, the cruise control ECU 1 obtains the current vehicle speed Vn, the steering angle θ, the yaw rate dω/dt, the controlled state of the braking force for each of the brakes 32, and the controlled state of the driving force sent via the CAN bus 24 in step S20.

Subsequently, in step S30, the cruise control ECU 1 executes a driver-instruction determining subroutine illustrated in FIG. 6.

Specifically, in step S301 of this subroutine, the cruise control ECU 1 determines:

whether information indicative ON, such as 1-bit data of "1", is set to a stopped-vehicle target flag $F_{gs}$; and whether information indicative ON, such as 1-bit data of "1", is set to a cut-in vehicle target flag $F_{gi}$.

Note that each of the stopped-vehicle target flag $F_{gs}$ and the cut-in vehicle target flag $F_{gi}$ is for example set by software in the cruise control ECU 1 each time the cruise control ECU 1 is booted up. The information indicative of OFF, such as 1-bit data of "0", is set as default information of each of the stopped-vehicle target flag $F_{gs}$ and the cut-in vehicle target flag $F_{gi}$.

When it is determined that the information indicative of ON is set to any one of the stopped-vehicle target flag $F_{gs}$ and the cut-in vehicle target flag $F_{gi}$ (the determination in step S301 is YES), the cruise control ECU 1 proceeds to step S307.

Otherwise, when it is determined that the information indicative of OFF is set to each of the stopped-vehicle target flag $F_{gs}$ and the cut-in vehicle target flag $F_{gi}$ (the determination in step S301 is NO), the cruise control ECU 1 proceeds to step S302A.

In step S302A, when receiving an instruction sent from the control switch 21, the cruise control ECU 1 determines that the received instruction corresponds to which of the tap-up operation, the tap-down operation, the accelerator operation, and the coast operation based on the operated direction (the upper direction or lower direction) of the control switch 21 and the duration of the control switch 21 being kept operated.

In step S302B, the cruise control ECU 1 determines whether the received instruction corresponds to the coast operation based on the result of determination in step S302A.

When it is determined that the received instruction does not correspond to the coast operation (the determination in step S302B is NO), the cruise control ECU 1 exits the driver-instruction determining subroutine, returning to step S40 of the cruise control task.

Otherwise, when it is determined that the received instruction corresponds to the coast operation (the determination in step S302B is YES), the cruise control ECU 1 determines whether the received instruction corresponding to the coast operation represents the stopped-vehicle selection instruction or the cut-in vehicle selection instruction in step S303.

When it is determined that the received instruction corresponding to the coast operation represents the stopped-vehicle selection instruction or the cut-in vehicle selection instruction (the determination in step S303 is affirmative), the cruise control ECU 1 proceeds to step S304, and otherwise, exiting the driver-instruction determining subroutine, returning to step S40 of the cruise control task.

In step S304, the cruise control ECU 1 references the storage unit SU thereof to determine whether the target for cruise control has already been determined (selected) based on the result of reference.

Specifically, when no target data has been stored in the storage unit SU or the target data stored in the storage unit SU represents undetermined target (see step S406 of FIG. 7 hereinafter), the cruise control ECU 1 determines that the target for cruise control has not been determined (selected) yet (the determination in step S304 is NO). Then, the cruise control ECU 1 shifts to step S306.

Otherwise, when the target data indicative of determined target (see step S405 of FIG. 7 hereinafter), the cruise control ECU 1 determines that the target for cruise control has already been determined (selected) (the determination in step S304 is YES). Then, the cruise control ECU 1 shifts to step S305.

In step S305, the cruise control ECU 1 determines that the received instruction represents the cut-in vehicle selection instruction, the cruise control ECU 1 stores, in the storage unit SU, the current determined target for cruise control, and changes the information held by the cut-in vehicle target flag $F_{gi}$ from OFF ("0") to ON ("1").

Specifically, in the storage unit SU, the target data indicative of the determined target for cruise control immediately before change of the cut-in vehicle target flag $F_{gi}$ from OFF ("0") to ON ("1") is stored as previous target data.

Thereafter, the cruise control ECU 1 returns to step S40 of the cruise control task.

In step S306, the cruise control ECU 1 determines that the received instruction represents the stopped-vehicle selection instruction, the cruise control ECU 1 changes the information held by the stopped-vehicle target flag $F_{gs}$ from OFF ("0") to ON ("1"), returning to step S40 of the cruise control task.

As described above, the driver's instruction determining subroutine determines that the received instruction from the control switch 21 based on the coast operation after the target for cruise control has already been determined corresponds to the cut-in vehicle selection instruction. In contrast, the driver's instruction determining subroutine determines that the received instruction from the control switch 21 based on the coast operation when the target for cruise control has not been determined yet corresponds to the stopped-vehicle selection instruction.

On the other hand, when the determination in step S301 is YES, in step S307, the cruise control ECU 1 determines whether the information indicative of ON is held in the stopped-vehicle target flag $F_{gs}$.

When it is determined that the information indicative of ON is held in the stopped-vehicle target flag $F_{gs}$ (the determination in step S370 is YES), the cruise control ECU 1 proceeds to step S380, and otherwise (the information indicative of ON is held in the cut-in vehicle target flag $F_{gi}$), the cruise control ECU 1 goes to step S311.

In step S308, as well as the operation in step S304, the cruise control ECU 1 determines whether the target for cruise control has already been determined.

When it is determined that the target for cruise control has already been determined (the determination in step S308 is YES), the cruise control ECU 1 proceeds to step S309 and changes the information held by the stopped-vehicle target flag $F_{gs}$ from ON ("1") to OFF ("0"), returning to step S40 of the cruise control task.

Otherwise, when it is determined that the target for cruise control has not been determined yet (the determination in step S308 is NO), the cruise control ECU 1 proceeds to step S310.

In step S310, the cruise control ECU 1 determines whether the driver has operated (depressed) the accelerator pedal.

When it is determined that the driver has operated (depressed) the accelerator pedal (the determination in step S310 is YES), the cruise control ECU 1 proceeds to step S309 to execute the operation therein set forth above, terminating the subroutine and returning to step S40 of the cruise control task.

Otherwise, when it is determined that the driver has not operated (depressed) the accelerator pedal (the determination in step S310 is NO), the cruise control ECU 1 terminates the subroutine, returning to step S40 of the cruise control task.

On the other hand, when the information indicative of ON is held in the cut-in vehicle target flag $F_{gi}$, in step S311, the cruise control ECU 1 references the storage unit SU. Then, the cruise control ECU 1 determines whether the determined target for cruise control has been changed before and after the change of the cut-in vehicle target flag $F_{gi}$ from OFF to ON by comparing the current target data stored in the storage unit SU with the previous target data stored therein.

When it is determined that the determined target for cruise control has been changed before and after the change of the cut-in vehicle target flag $F_{gi}$ from OFF to ON (the determination in step S311 is YES), the cruise control ECU 1 proceeds to step S312, and otherwise, goes to step S314.

In step S312, the cruise control ECU 1 compares the current target data stored in the storage unit SU with the previous target data to determine whether the distance Z0 between the current determined target of the current target data and the vehicle V is shorter than that between the previous determined target of the previous target data.

When it is determined that the distance Z0 between the current determined target of the current target data and the vehicle V is shorter than that between the previous determined target of the previous target data (the determination in step S312 is YES), the cruise control ECU 1 proceeds to step S313, and otherwise, goes to step S314.

In step S313, the cruise control ECU 1 changes the information held by the cut-in vehicle target flag $F_{gi}$ from ON ("1") to OFF ("0"), returning to step S40 of the cruise control task.

In step S314, the cruise control ECU 1 determines whether the driver has operated (depressed) the accelerator pedal.

When it is determined that the driver has operated (depressed) the accelerator pedal (the determination in step S314 is YES), the cruise control ECU 1 proceeds to step S313 to execute the operation therein set forth above, terminating the subroutine and returning to step S40 of the cruise control task.

Otherwise, when it is determined that the driver has not operated (depressed) the accelerator pedal (the determination in step S314 is NO), the cruise control ECU 1 terminates the subroutine, returning to step S40 of the cruise control task.

Next, in step S40, the cruise control ECU 1 executes a target determining subroutine illustrated in FIG. 7.

For example, in the embodiment, it is assumed that a plurality of objects OB are detected by the radar sensor 11 so that the forward-object data of each of the plurality of objects OB is measured to be sent from the radar sensor 11 to the cruise control ECU 1. The forward-object data of each of the plurality of objects OB is received by the cruise control ECU 1 in step S10.

In step S401 of this subroutine, the cruise control ECU 1 determines whether all of the detected objects OB respectively meet both the first extraction condition and at least one of the second to fourth extraction conditions. Thereafter, in step S401, a first extracting unit in the cruise control ECU 1 extracts, as a target candidate for a cut-in vehicle, at last one of the objects OB that meets both the first extraction condition and at least one of the second to fourth extraction conditions based on the determination.

The first extraction condition is that the distance Z of each of the objects OB in the Z axis is lower than the sum of the distance Z0 of the current determined target and a constant value Dz, which is given by the equation of "Z<Z0+Dz.

The second extraction condition is that the relative velocity Vr between the vehicle V and each of the objects OB is less than 0, which is given by the equation of "Vr<0".

The third extraction condition is that:
both the lateral position Xs of each of the objects OB being greater than 0 (Xs>0) and the lateral relative velocity Vs being lower than −Vx (Vs<−Vx) are established; or
both the lateral position Xs of each of the objects OB being lower than 0 (Xs<0) and the lateral relative velocity Vs being higher than Vx (Vs>Vx) are established, where Vx represents a positive constant value.

The fourth extraction condition is that:
both the lateral position Xs of each of the objects OB being greater than 0 (Xs>0) and a value A obtained by the subtraction of a horizontal position Xso from the horizontal position Xs of a corresponding one of the objects OB is lower than −Xsx (A<−Xsx) are established; or both the lateral position Xs of each of the objects OB being lower than 0 (Xs<0) and a value B obtained by the subtraction of the lateral position Xso from the lateral position Xs of a corresponding one of the objects OB is higher than Xsx (B>Xsx) are established. Note that Xso represents the lateral position of each of the objects OB when the cut-in vehicle target flag $F_{gi}$ is changed from OFF ("0") to ON ("1") (see step S305 in FIG. 6), and Xsx represents a positive constant value.

Specifically, the first extraction condition allows detection of a cut-in vehicle located at a little distance away from the current determined target (leading vehicle) with respect to the vehicle V; this cut-in vehicle runs at a speed lower than that of the current determined target (leading vehicle).

The second extraction condition represents whether each of the objects OB and the vehicle V approach towards each other.

The third extraction condition represents whether each of the objects OB approaches toward the vehicle V in the X axis direction using the lateral relative velocity Vs.

The fourth extraction condition represents whether each of the objects OB approaches toward the vehicle V in the X axis direction based on the shift amount of the lateral position of a corresponding one of the objects OB in the X axis direction.

Next, in step S402, the cruise control ECU 1 determines whether all of the detected objects OB respectively meet at least one of the fifth, sixth, and seventh extraction conditions. Thereafter, in step S402, a second extracting unit in the cruise control ECU 1 extracts, as a target candidate for a leading vehicle, at last one of the objects OB that meets at least one of the fifth, sixth, and seventh extraction conditions based on the determination.

The fifth extraction condition is that both the type of each of the objects OB being a moving object and the same-lane probability Pi of a corresponding one of the objects OB being higher than a predetermined value are established.

The sixth extraction condition is that both the stopped-vehicle target flag $F_{gs}$ being set to ON ("1") and the same-lane probability Pi of each of the objects OB being higher than the predetermined value are established.

The seventh extraction condition is that both the cut-in vehicle target flag $F_{gi}$ being set to ON ("1") and each of the objects OB being extracted in step S401.

The fifth extraction condition allows forward vehicles each having a high possibility of running along the same lane as the vehicle V as a moving object to be reliably extracted as target candidates for the leading vehicle.

The sixth and seventh extraction conditions are added to the fifth extraction condition required to extract target candidates for the leading vehicle when the stopped-vehicle target flag $F_{gs}$ and the cut-in vehicle target flag $F_{gi}$ are respectively set to ON ("1").

In other words, the sixth and seventh extraction conditions are added to the fifth extraction condition required to extract target candidates for the leading vehicle when the driver carries out, with the use of the control switch 21, the coast operation corresponding to the stopped-vehicle selection instruction or the cut-in vehicle selection instruction. Thus, the driver's instruction (stopped-vehicle selection instruction or the cut-in vehicle selection instruction) allows stopped vehicles or cut-in vehicles to be reliably extracted.

In the embodiment, even if the radar sensor 11 detects stationary objects except for stopped vehicles, no driver's instructions (the stopped-vehicle selection instruction or the cut-in vehicle selection instruction) are input to the cruise control ECU 1 from the control switch 21. This prevents the sixth and seventh extraction conditions from being added to the fifth extraction condition required to extract target candidates for cruise control.

In contrast, only when the driver's instructions (the stopped-vehicle selection instruction or the cut-in vehicle selection instruction) are input to the cruise control ECU 1 from the control switch 21, it is possible to add the sixth and seventh extraction conditions to the fifth extraction condition required to extract target candidates for cruise control.

This makes it possible to avoid extraction of stationary objects except for stopped vehicles located on the same lane as the vehicle V in front thereof as much as possible.

In addition, let us consider another vehicle tries to cut in front of the vehicle V running the one lane from a position on another lane adjacent to the one lane; this position is comparatively close to the vehicle V.

In this case, even if the radar sensor 11 is difficult to detect another vehicle at an early stage of the cut-in thereof, immediately after recognizing another vehicle cutting in front of the vehicle V at the early stage of the cut-in, the driver carries out the coast operation using the control switch 21. This allows the cut-in vehicle selection instruction to be rapidly input to the cruise control ECU 1, and therefore, another vehicle cutting in front of the vehicle V can be extracted as a target candidate for cruise control in quick response to the start of the cut-in of another vehicle. Thus, it is possible to change the target for cruise control from the previous leading vehicle to another vehicle cutting in front of the vehicle V in quick response to the start of the cut-in of another vehicle.

The seventh extraction condition allows, when the cut-in vehicle target flag $F_{gi}$ is set to ON ("1"), at least one object OB meeting the fourth extraction condition using the lateral position Xs and the shift amount of the at least one object OB in the X axis direction to be more reliably extracted as a target candidate for the leading vehicle.

Subsequently, in step S403, the cruise control ECU 1 determines whether a group of the target candidates for the leading vehicle is extracted in step S402.

When it is determined that the group of the target candidates for the leading vehicle is extracted in step S402 (the determination in step S403 is affirmative), the cruise control ECU 1 proceeds to step S404, and otherwise, going to step S406.

In step S404, a target selecting unit in the cruise control ECU 1 determinately selects one of the target candidates in the group extracted in step S402 as a determined target for cruise control; this one of the target candidates has the distance Z0 with respect to the vehicle V that is the shortest in the group of the target candidates.

Specifically, when one of the candidate cut-in vehicles is selected in step S404, the one of the candidate cut-in vehicles starting to cut in front of the vehicle V from a position of another lane adjacent to the one lane; this position is the closest to the vehicle V in all of the candidate cut-in vehicles, can be selected as the determined target for cruise control.

In step S405, the cruise control ECU 1 stores (updates), in the storage unit SU, the forward-object data corresponding to the determined target as the target data, returning to step S50 of the cruise control task.

In contrast, in step S406, the cruise control ECU 1 stores (updates), in the storage unit, data indicative of undetermined target as the target data, returning to step S50 of the cruise control task.

Next, in step S50, the cruise control ECU 1 executes a target acceleration computing subroutine illustrated in FIG. 8.

Figure 9:
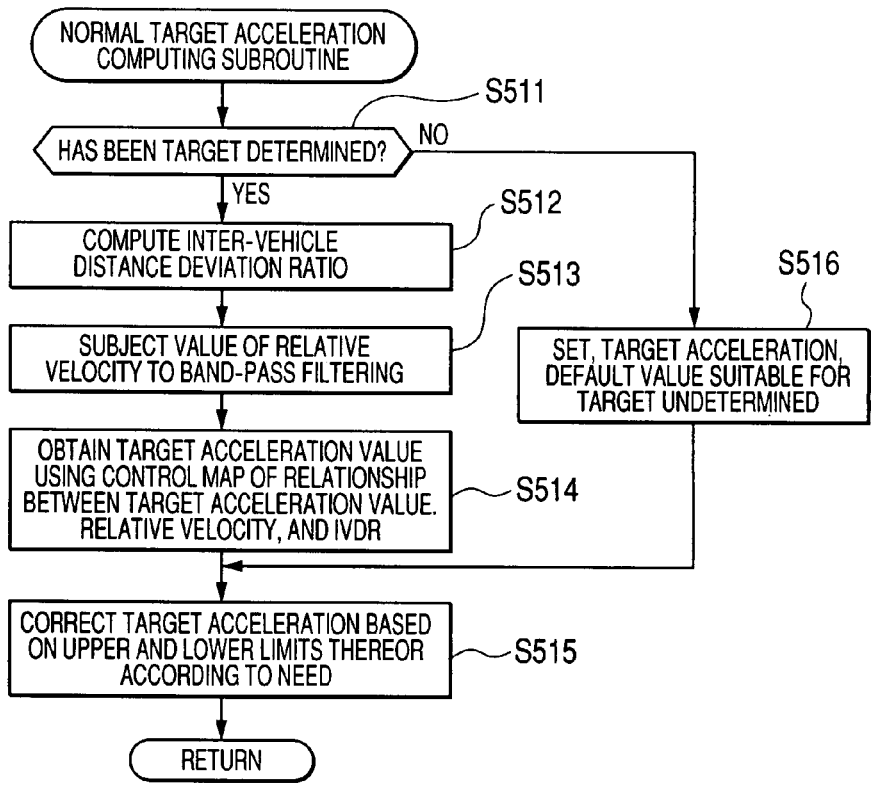
FIG. 9 is a flowchart schematically illustrating a normal target acceleration computing subroutine to be called by the cruise control ECU during execution of the target acceleration computing subroutine illustrated in FIG. 8.

In step S501, the cruise control ECU 1 executes a normal target acceleration computing subroutine illustrated in FIG. 9.

In step S511 of this subroutine, like the operation in step S304, the cruise control ECU 1 determines whether the target for cruise control has already been determined.

When it is determined that the target for cruise control has already been determined (the determination in step S511 is YES), the cruise control ECU 1 proceeds to step S512. Otherwise, when it is determined that the target for cruise control has not been determined yet (the determination in step S511 is NO), the cruise control ECU 1 proceeds to step S516. In step S516, the cruise control ECU 1 sets, to the target acceleration, a default value previously determined to be suitable for the target for cruise control being undetermined, returning to step S60 of the cruise control task.

In step S512, the cruise control ECU 1 computes an inter-vehicle distance deviation ratio IVDR [%] in accordance with the following equation [3]:

$$IVDR[\%] = (Z0 - D)/D \qquad [3]$$

Where Z0 represents the distance between the current determined target and the vehicle V, and D represents a target inter-vehicle distance. Note that the target inter-vehicle distance D can be obtained by multiplying one of the first to third target time-headways by the current vehicle speed Vn.

Next, in step S513, the cruise control ECU 1 subjects a value of the relative velocity Vr between the vehicle V and the current determined target to band-pass filtering (BPF), thus eliminating the current value of the relative velocity Vr when it temporarily goes out of a predetermined range of the band-pass filtering.

In step S514, the cruise control ECU 1 obtains, using a control map M stored in the storage unit SU, a target acceleration value depending on a value of the relative velocity Vr passing through the predetermined range of the band-pass filtering and on a value of the inter-vehicle distance deviation ratio IVDR temporally corresponding to the value of the relative velocity Vr.

Figure 10:
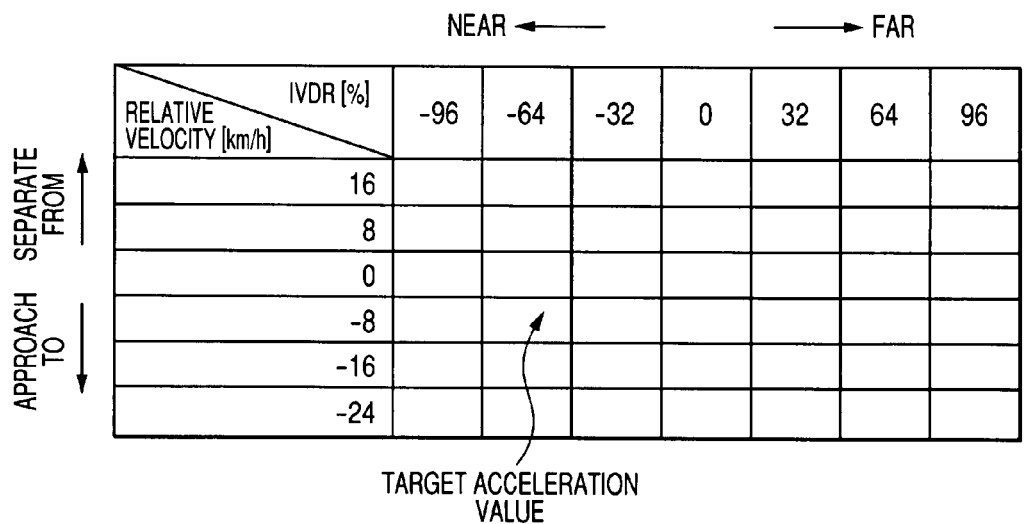
FIG. 10 is a view schematically illustrating a control map representing a relationship between a variable of a target acceleration value, a variable of a relative velocity, and a variable of an inter-vehicle distance deviation ratio according to the embodiment.

As illustrated in FIG. 10, the control map M is composed of, for example, a data table and/or a program. The control map M represents a relationship between a variable of the target acceleration value, a variable of the relative velocity Vr, and a variable of the inter-vehicle distance deviation ratio IVDR; this relationship has been determined by simulations and/or tests. For example, the greater the inter-vehicle distance deviation ratio IVDR is, the more the current determined target is separated from the vehicle V, and vice versa. Similarly, the greater the relative velocity Vr is, the more the current determined target is separated from the vehicle V, and vice versa.

For example, in the embodiment, the cruise control ECU 1 references the map M using a value of the relative velocity Vr and that of the inter-vehicle distance deviation ration IVDR to determine a target acceleration value corresponding to the input values of the relative velocity Vr and the inter-vehicle distance deviation ration IVDR in step S514.

In step S515, the cruise control ECU 1 compares the target acceleration value determined in step S514 with predetermined upper and lower limits of acceleration, such as ±2 m/s$^2$. When it is determined that the target acceleration value is positive and greater than the upper limit of acceleration, such as +2 m/s$^2$ based on the comparison, the cruise control ECU 1 sets the upper limit of acceleration as the target acceleration value, returning to step S502 of the target acceleration computing subroutine. When it is determined that the target acceleration value is negative and lower than the lower limit of acceleration, such as −2 m/s$^2$ based on the comparison, the cruise control ECU 1 sets the lower limit of acceleration as the target acceleration value, returning to step S502 of the target acceleration computing subroutine.

In step S502, the cruise control ECU 1 determines whether the information held in the stopped-vehicle target flag $F_{gs}$ is ON ("1"). When it is determined that the information held in the stopped-vehicle target flag $F_{gs}$ is ON ("1") (the determination in step S502 is YES), the cruise control ECU 1 proceeds to step S503, and otherwise, going to step S504.

In step S503, the cruise control ECU 1 determines a definite target acceleration for the vehicle V to a negative ALH, such as −1 [m/s$^2$], terminating the target acceleration computing subroutine.

In step S504, the cruise control ECU 1 determines whether the information held in the cut-in vehicle target flag $F_{gi}$ is ON ("1"). When it is determined that the information held in the cut-in vehicle target flag $F_{gi}$ is ON ("1") (the determination in step S504 is YES), the cruise control ECU 1 proceeds to step S505.

Otherwise, when it is determined that the information held in the cut-in vehicle target flag $F_{gi}$ is OFF ("0") (the determination in step S504 is NO), the cruise control ECU 1 determines that no stopped-vehicle selection instruction and cut-in vehicle selection instruction are input to the cruise control ECU 1 from the control switch 21. Then, the cruise control ECU 1 sets, as the target acceleration for the vehicle V, the target acceleration value computed in the normal target acceleration computing subroutine illustrated in FIG. 9.

In step S505, the cruise control ECU 1 determines whether the target acceleration value computed in the normal target acceleration computing subroutine illustrated in FIG. 9 is greater than 0 [m²/s]. When it is determined that the target acceleration value computed in the normal target acceleration computing subroutine illustrated in FIG. 9 is greater than 0 (the determination in step S505 is YES), the cruise control ECU 1 proceeds to step S506, and otherwise, going to step S507.

In step S506, the cruise control ECU 1 determines that the cut-in vehicle selection instruction inputted by the driver is received thereto, and therefore, determines a definite target acceleration for the vehicle V to a negative ALW, such as −0.07 [m/s²], terminating the target acceleration computing subroutine.

In step S507, the cruise control ECU 1 determines a definite target acceleration for the vehicle V by adding the negative ALW to the target acceleration value computed in the normal target acceleration computing subroutine illustrated in FIG. 9.

Specifically, because the determination in step S504 is YES and the determination in step S505 is NO, after the cut-in vehicle selection instruction has been received by the cruise control ECU 1, the deceleration control or acceleration holding-down control is executed by the cruise control ECU 1. Therefore, the operation in step S507 allows the negative target acceleration to more increase in the negative direction.

In the embodiment, the ALH and ALW are negative values and the absolute value of the ALH is lower than that of the ALW. The negative target acceleration ALH determined when the stopped-vehicle selection instruction is input to the cruise control ECU 1 is greater in the negative direction than the negative target acceleration ALW determined when the cut-in vehicle selection instruction is input to the cruise control ECU 1.

Specifically, when the stopped vehicle selection instruction is received by the cruise control ECU 1, the cruise control ECU 1 decelerates the vehicle V by the negative target acceleration ALH greater in the negative direction than the negative target acceleration ALW used when the cut-in vehicle selection instruction is received by the cruise control ECU 1. This is because the relative velocity between the vehicle V and a stopped vehicle in front of the vehicle V is greater than that between the vehicle V and another vehicle cutting in front thereof.

As set forth above, the driver's coast operation using the control switch 21 for inputting the stopped vehicle selection instruction or the cut-in vehicle selection instruction to the cruise control ECU 1 allows the cruise control ECU 1 to start deceleration of the vehicle V or holding-down of acceleration thereof. The deceleration or holding-down of acceleration of the vehicle V is continuously executed until the target cruise control is determined in step S308. For this reason, even if the target has not been determined yet so that the start of the cruise control is delayed, it is possible to slow the approach of the vehicle V to the stopped vehicle.

Figure 6:
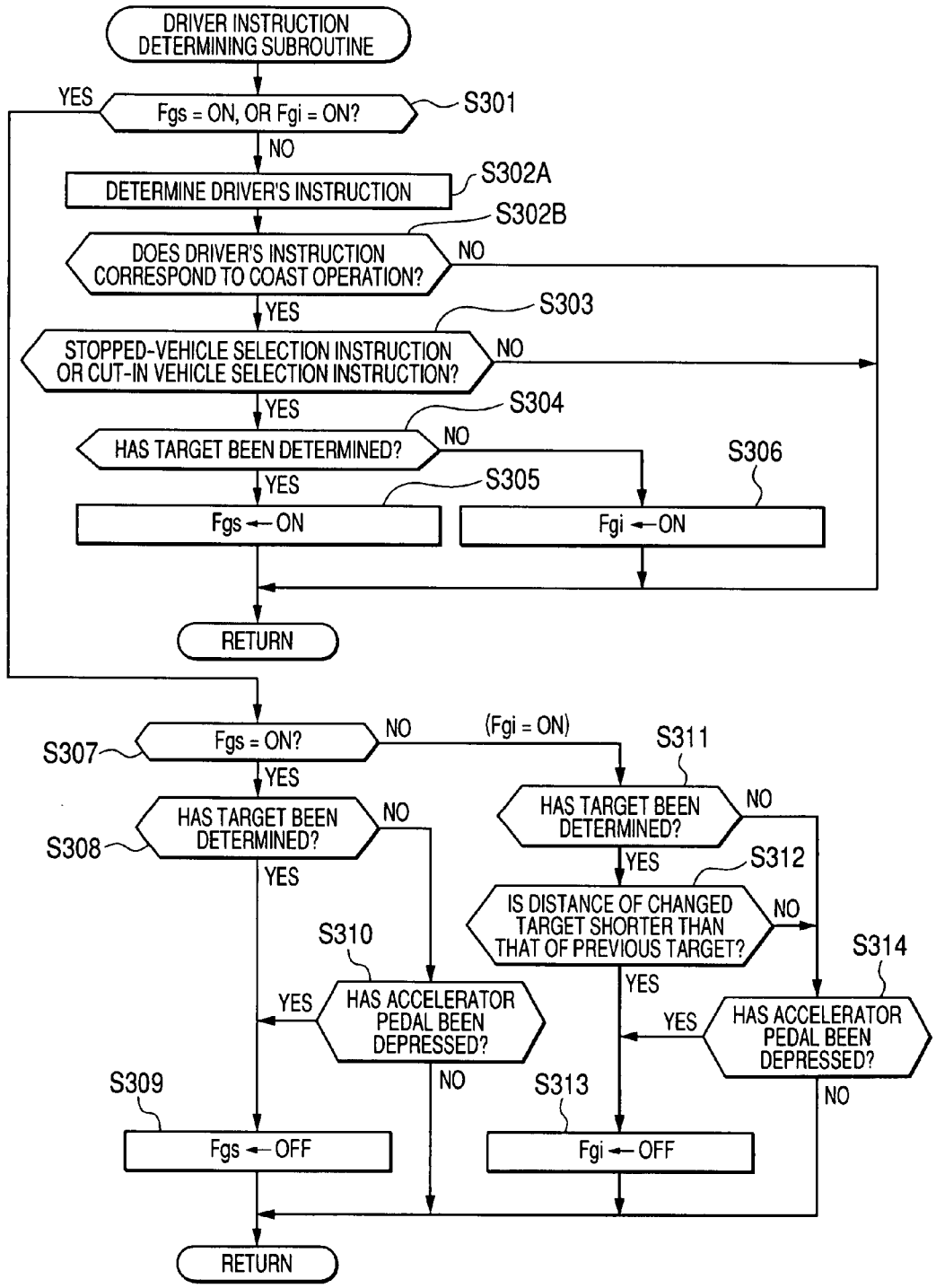
FIG. 6 is a flowchart schematically illustrating a driver-instruction determining subroutine called by the cruise control ECU during execution of the cruise control task illustrated in FIG. 5.

While continuously executing the deceleration control or acceleration holding-down control (third driving mode), when the accelerator pedal is depressed by the driver (the determination in step S310 or S314 of FIG. 6), the cruise control ECU 1 terminates the deceleration control or acceleration holding-down control (see step S309 or S313 of FIG. 6). Specifically, the driver's operation of the accelerator pedal allows the deceleration control or the acceleration holding-down control to be terminated. After termination of the deceleration control or acceleration holding control, the cruise control ECU 1 can therefore smoothly shift to execution of the constant-speed control or the inter-vehicle distance maintaining control.

When starting to execute the deceleration or acceleration holding-down control in response to receiving the cut-in vehicle selection instruction, the cruise control ECU 1 continuously executes it until selecting, as a new target for cruise control, another cutting vehicle having a distance from the vehicle V shorter than that of the previous target therefrom until just before the instruction unless the accelerator pedal is depressed.

In other words, when starting to execute the deceleration or acceleration holding-down control in response to receiving the cut-in vehicle selection instruction, the cruise control ECU 1 continuously executes it until the determination in step S312 is affirmative unless the determination in step S314 is affirmative.

Even if the target has not been determined yet so that the start of the cruise control is delayed, it is possible to therefore slow the approach of the vehicle V to the stopped vehicle.

After completion of the target acceleration computing subroutine, the cruise control ECU 1 determines whether the brake request is required to be sent to the brake ECU 2 based on the target acceleration computed in the target acceleration computing subroutine illustrated in FIG. 8 in step S60 of the cruise control task.

Specifically, when the computed target acceleration represents a positive value, the cruise control ECU 1 determines there is no need to send the brake request to the brake ECU 2 (the determination in step S60 is NO), going to step S70.

Otherwise, when the computed target acceleration represents a negative value, the cruise control ECU 1 determines there is the need to send the brake request to the brake ECU 2 (the determination in step S60 is YES), thus sending the brake request to the brake ECU 2 through the CAN bus 24 in step S65.

In response to receiving the brake request, the brake ECU 2 controls the braking force to be applied from each of the brakes 9b to a corresponding one of the wheels to thereby adjusting the acceleration of the vehicle V to the target acceleration. This makes it possible to execute the cruise control of the vehicle V under any one of the first to fourth driving modes.

Next, in step S70, the cruise control ECU 1 determines whether the ON signal is required to be sent to the alarm device 23 based on, for example, the distance Z0 between the vehicle V and the current determined target, the relative velocity Vr therebetween, the computed target acceleration, and on whether to receive the start-permission instruction.

When it is determined there is no need to output the ON signal to the alarm device 23 (the determination in step S70 is NO), the cruise control ECU 1 goes to step S80.

Otherwise, let us consider computed target acceleration represents a negative value that exceeds a predetermined maximum negative acceleration (deceleration) determined to be creatable by the cruise control system CE for safety of occupants in the vehicle V.

In this case, the cruise control ECU 1 determines that there is the need to send the ON signal to the alarm device 23 (the determination in step S70 is YES), thus sending the ON signal to the alarm device 23 through the CAN bus 24 in step S75.

In response to receiving the ON signal, the alarm device 23 gives an alarm indicative of cautions for leading vehicles to the driver of the vehicle V.

Subsequently, in step 80, the cruise control ECU 1 estimates the radius R of curvature of the vehicle V in accordance with the equation [1] set forth above based on the current vehicle speed Vn detected by each of the vehicle speed sensors 12 and on the steering angle θ measured by the steering sensor 14.

Next, in step S90, the cruise control ECU 1 sends the estimated radius R of curvature of the vehicle V to the radar sensor 11, which allows the radar sensor 11 to obtain the lateral position Xs of the current determined target in accordance with the equation [2] set forth above.

In step S100, the cruise control ECU 1 sends various items of data associated with the driving conditions (operating conditions) of the vehicle V to the meter ECU 3. The meter ECU 3 controls at least one of the displays 35 to display some of the various items of data thereon, and/or controls at least one of the various warning lights to turn it on for indicating at least one of the various items of data.

As described above, in the embodiment, the sixth and seventh extraction conditions that enable the cruise control ECU 1 to detect stopped vehicles and cut-in vehicles as target candidates for cruise control are newly established therein when an instruction according to, for example, the driver's recognition of stopped vehicles and cut-in vehicles is sent to the cruise control ECU 1.

Thus, even if the radar sensor 11 cannot detect a stopped vehicle or a cut-in vehicle in front of the vehicle V or cause delay in detecting it, the driver's instruction (stopped-vehicle selection instruction or the cut-in vehicle selection instruction) allows the stopped vehicle or the cut-in vehicle to be reliably extracted.

In addition, even if the radar sensor 11 detects stationary objects except for stopped vehicles, no driver's instructions (the stopped-vehicle selection instruction or the cut-in vehicle selection instruction) are input to the cruise control ECU 1 from the control switch 21. This prevents the sixth and seventh extraction conditions that allow the cruise control ECU 1 to detect stopped vehicle and cut-in vehicles as target candidates for cruise control from being newly set in the cruise control ECU 1.

In contrast, only when the driver's instructions (the stopped-vehicle selection instruction or the cut-in vehicle selection instruction) are input to the cruise control ECU 1 from the control switch 21, it is possible to establish, in the cruise control ECU 1, the sixth and seventh extraction conditions.

This makes it possible to avoid extraction of stationary objects except for stopped vehicles located on the same lane as the vehicle V in front thereof as much as possible.

In addition, in the embodiment, even if the radar sensor 11 is difficult to detect a cut-in vehicle in front of the vehicle V at an early stage of the cut-in, immediately after recognizing the cut-in vehicle at the early stage of the cut-in, the driver carries out the coast operation using the control switch 21. This allows the cut-in vehicle selection instruction to be rapidly input to the cruise control ECU 1, and therefore, the cut-in vehicle in front of the vehicle V can be extracted as a target candidate for cruise control in quick response to the start of the cut-in of another vehicle.

Thus, it is possible to change the target for cruise control from the previous leading vehicle to the cut-in vehicle in quick response to the start of the cut-in, thus increasing the cruise-control performance of the cruise-control system CS installed in the vehicle V.

In the embodiment, the radar sensor 11 is used to scan laser beams over a predetermined scanning field in front of the vehicle V so as to monitor the scanning field, but other types of monitoring devices, such as cameras, can be used.

While there has been described what is at present considered to be the embodiment and its modifications of the present invention, it will be understood that various modifications which are not described yet may be made therein, and it is intended to cover in the appended claims all such modifications as fall within the true spirit and scope of the invention.

What is claimed is:

1. A cruise control system installed in a system vehicle, the cruise control system comprising:
a monitoring unit monitoring a predetermined region in front of the system vehicle when the system vehicle is located on a lane of a road to detect a position and a speed of at least one object;
an instruction input unit allowing a driver of the system vehicle to input an instruction indicating that a stopped vehicle or a cutting vehicle is present in front of the system vehicle; and
a target determining unit executing a determination of a target for adjusting an interval of the system vehicle with respect to the target,
wherein the target determining unit has a first condition and a second condition, the first condition representing that the at least one object has a same-lane probability higher than a preset value, the second condition representing that the at least one object is determined to approach toward the system vehicle based on a shift amount of lateral position of the at least one object,
the target detecting unit being configured to:
determine, based on the position and speed of the at least one object, whether the at least one object meets the first condition to determine whether the at least one object is a forward vehicle as the target; and
when the instruction is input to the instruction input unit by the driver, add the second condition to the first condition to thereby determine, based on the position and speed of the at least one object, whether the at least one object meets one of the first condition and the second condition to determine whether the at least one object is, as the target, one of the forward vehicle and a cutting vehicle cutting into the same lane as the system vehicle.

2. A cruise control system according to claim 1, wherein the at least one object is provided in plurality, the target determining unit further comprising:
a first extracting unit extracting at least one of the plurality of objects that meets the first condition as at least one first candidate for the target;
a target selecting unit selecting the target from the at least one first candidate when the instruction is not input to the target determining unit; and
a second extracting unit extracting at least one of the plurality of objects that meets one of the first condition and the second condition as at least one second candidate for the target when the instruction is input from the instruction input unit, the target selecting unit selecting the target from the at least one second candidate for the target.

3. A cruise control system according to claim 2, further comprising:
a vehicle-speed control unit starting one of deceleration of the system vehicle and holding-down of acceleration in response to the instruction being input from the instruction input unit to the second extracting unit.

4. A cruise control system according to claim 3, further comprising:
an instruction determining unit determining whether the driver's recognized information of the instruction input into the instruction input unit represents that the at least one object is a stopped vehicle in the same lane as the system vehicle or the cutting vehicle moving into the same lane as the system vehicle,
wherein the vehicle-speed control unit executes one of the deceleration of the system vehicle and holding-down of acceleration of the system vehicle so as to change a rate of a speed of the system vehicle depending on a result of the determination by the instruction determining unit.

5. A cruise control system according to claim 4, wherein the instruction determining unit:
determines that the driver's recognized information of the instruction input into the instruction input unit represents that the at least one object is the cutting vehicle moving into the same lane as the system vehicle upon the instruction being input to the second extracting unit after the target has been selected by the target selecting unit; and
determines that the driver's recognized information of the instruction represents that the at least one object is the stopped vehicle on the same lane as the system vehicle upon the instruction being input to the second extracting unit when the target has been unselected by the target selecting unit.

6. A cruise control system according to claim 4, wherein the vehicle-speed control unit executes, when the driver's recognized information of the instruction represents that the at least one object is the stopped vehicle on the same lane as the system vehicle, one of the deceleration of the system vehicle and holding-down of acceleration of the system vehicle so as to increase the rate of reduction of the speed of the system vehicle as compared with when the driver's recognized information of the instruction represents that the at least one object is the cutting vehicle moving into the same lane as the system vehicle.

7. A cruise control system according to claim 4, wherein the vehicle-speed control unit continuously executes, when the driver's recognized information of the instruction represents that the at least one object is the cutting vehicle moving into the same lane as the system vehicle, one of the deceleration of the system vehicle and holding-down of acceleration of the system vehicle until the target has been selected by the target selecting unit.

8. A cruise control system according to claim 7, further comprising:
an accelerator-pedal operation detecting unit detecting operation of an accelerator pedal of the system vehicle by the driver,
wherein, during execution of one of the deceleration of the system vehicle and holding-down of acceleration of the system vehicle, the vehicle-speed control unit terminates the executed one of the deceleration of the system vehicle and holding-down of acceleration of the system vehicle when the accelerator-pedal operation detecting unit detects operation of the accelerator pedal by the driver.

9. A cruise control system according to claim 2, wherein the instruction input unit comprises a lever switch arranged at least close to a steering wheel of the system vehicle to be movable by the driver in a first direction and a second direction different from the first direction, the instruction input unit:
sending the instruction to the second extracting unit when the driver operates the lever switch in any one of the first and second directions and keeps the operated state of the lever switch during the first period; and
sending an other instruction to the second extracting unit when the driver operates the lever switch in any one of the first and second directions and keeps the operated state of the lever switch during a second period lower than the first period, and the second extracting unit further comprises:
a driver's operation determining unit determining whether information being input thereto from the instruction input unit represents the instruction indicative of the driver's recognized information based on the first period and a duration of the lever switch being kept operated by the driver.

10. A cruise control system according to claim 4, further comprising:
an obtaining unit obtaining a same-lane probability of each of the plurality of objects on the same lane as the system vehicle and at least one of a lateral position of each of the plurality of objects with respect to the system vehicle in a lateral direction of the lane and a shift amount of each of the plurality of objects with respect to the system vehicle in the lateral direction of the lane based on the monitored information detected by the monitored unit,
the second extracting unit:
extracting, as the at least one second candidate for the target, at least one of the plurality of objects that meets one of the first condition and the second condition based on the same-lane probability of each of the plurality of objects; and
extracting, as the at least one second candidate for the target, at least one of the plurality of objects that meets one of the first condition and the second condition based on the same-lane probability and at least one of the lateral direction and the amount of lateral movement of each of the plurality of objects when receiving the instruction indicative of the driver's recognized information representing that the at least one object is one of the stopped vehicle in the same lane as the system vehicle and the cutting vehicle moving into the same lane as the system vehicle.

11. A cruise control system according to claim 10, wherein, when the instruction is input from the instruction input unit, the second extracting unit extracts, as a number of the second candidates for the target, a corresponding number of the plurality of objects that meet one of the first condition and the second condition, and
the target selecting unit selects, as the target, one of the number of the extracted second candidates, the one of the number of the second candidates having the smallest distance with respect to the system vehicle in the number of the extracted second candidates.

12. A cruise control system according to claim 11, wherein the vehicle-speed control unit continuously executes one of the deceleration of the system vehicle and holding-down of acceleration of the system vehicle until the target selecting unit changes to select, as the target, from a previous one of the number of the extracted second candidates to a new one of the number of the extracted second candidates, a distance of the new one of the number of the extracted second candidates being smaller than that of the previous one of the number of the extracted second candidates.

13. A cruise control system according to claim 10, further comprising:
an accelerator-pedal operation detecting unit detecting operation of an accelerator pedal of the system vehicle by the driver,
wherein, during execution of one of the deceleration and holding-down of acceleration of the system vehicle, the vehicle-speed control unit terminates the executed one of the deceleration and holding-down of acceleration of the system vehicle when the accelerator-pedal operation detecting unit detects operation of the accelerator pedal by the driver.

14. A cruise control system according to claim 1, wherein the target determining unit has a third condition, the third condition representing that the at least one object has the same-lane probability higher than the preset value as long as the instruction indicative of the at least one object being a stopped vehicle has been input from the instruction unit, when the instruction is input from the instruction input unit, add the second condition and the third condition to the first condition to thereby determine, based on the position and speed of the at least one object, whether the at least one object meets one of the first condition, the second condition, and the third condition to determine whether the at least one object is, as the target, one of the forward vehicle, the cutting vehicle to the same lane as the system vehicle, and a stopped vehicle in the same lane as the system vehicle.

15. The cruise control system according to claim 1, wherein only when the instruction is input from the instruction input unit, the target detection unit adds the second condition to the first condition to thereby determine, based on the position and speed of the at least one object, whether the at least one object meets one of the first condition and the second condition to determine whether the at least one object is, as the target, one of the forward vehicle and a cutting vehicle to the same lane as the system vehicle.

\* \* \* \* \*